US012156081B2

(12) United States Patent
Kim et al.

(10) Patent No.: US 12,156,081 B2
(45) Date of Patent: Nov. 26, 2024

(54) METHOD AND APPARATUS FOR PERFORMING HANDOVER IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/039,797

(22) Filed: Sep. 30, 2020

(65) Prior Publication Data

US 2021/0105675 A1    Apr. 8, 2021

(30) Foreign Application Priority Data

Oct. 2, 2019   (KR) .................. 10-2019-0122644
Oct. 31, 2019  (KR) .................. 10-2019-0138087

(51) Int. Cl.
*H04W 36/00*   (2009.01)
*H04W 12/03*   (2021.01)
(Continued)

(52) U.S. Cl.
CPC ....... *H04W 36/0069* (2018.08); *H04W 12/03* (2021.01); *H04W 12/10* (2013.01);
(Continued)

(58) Field of Classification Search
CPC ... H04W 12/03; H04W 12/033; H04W 12/10; H04W 12/106; H04W 28/06; H04W 36/0069
See application file for complete search history.

(56) References Cited

U.S. PATENT DOCUMENTS 11,405,832 B2   8/2022  Yi et al.
2009/0017826 A1 1/2009  Shaheen
(Continued)

FOREIGN PATENT DOCUMENTS

CN   105103610 A      11/2015
EP     1883263 A1  *   1/2008  ........ H04W 36/0055
(Continued)

OTHER PUBLICATIONS

International Search Report and Written Opinion of the International Searching Authority in connection with International Application No. PCT/KR2020/013075 dated Jan. 12, 2021, 10 pages.
CATT, "PDCP Aspects of DAPS-LTE," R2-1908920, 3GPP TSG RAN WG2 Meeting #107, Prague, Czech Republic, Aug. 26-30, 2019, 3 pages.
Ericsson, "Release of source cell in eMBB handover," Tdoc R2-1908975, 3GPP TSG RAN WG2 Meeting #107, Prague, Czech Republic, Aug. 26-30, 2019, 5 pages.
(Continued)

*Primary Examiner* — Zhensheng Zhang

(57) ABSTRACT

A method of performing dual active protocol stack (DAPS) handover by a user equipment (UE) in a wireless communication system includes: receiving, from a source base station, a radio resource control (RRC) reconfiguration message including DAPS configuration information indicating at least one bearer for a DAPS handover; reconfiguring, for the DAPS handover, a packet data convergence protocol (PDCP) entity corresponding to the at least one bearer for the DAPS handover; and establishing protocol entities for a target cell corresponding to the at least one bearer for the DAPS handover.

8 Claims, 13 Drawing Sheets

(51) Int. Cl.
*H04W 12/10* (2021.01)
*H04W 28/06* (2009.01)
*H04W 76/27* (2018.01)
*H04W 76/30* (2018.01)
*H04W 80/02* (2009.01)
*H04W 80/08* (2009.01)

(52) U.S. Cl.
CPC ........... *H04W 28/06* (2013.01); *H04W 76/27* (2018.02); *H04W 76/30* (2018.02); *H04W 80/02* (2013.01); *H04W 80/08* (2013.01)

(56) References Cited

U.S. PATENT DOCUMENTS

| | | | | |
|---|---|---|---|---|
| 2010/0297998 | A1* | 11/2010 | Hapsari | H04W 36/0072 455/438 |
| 2019/0174571 | A1* | 6/2019 | Deenoo | H04W 76/11 |
| 2019/0253945 | A1 | 8/2019 | Paladugu et al. | |
| 2020/0022035 | A1* | 1/2020 | Kadiri | H04W 36/0072 |
| 2021/0014339 | A1* | 1/2021 | Zhang | H04W 36/18 |

FOREIGN PATENT DOCUMENTS

| | | | |
|---|---|---|---|
| EP | 3 021 612 A2 | 5/2016 | |
| WO | 2016/021820 A1 | 2/2016 | |
| WO | 2017138978 A1 | 8/2017 | |

OTHER PUBLICATIONS

Mediatek Inc. et al., "UL Handling with DAPS during RUDI Handover," R2-1909178, 3GPP TSG RAN WG2 Meeting #107, Prague, Czech Republic, Aug. 26-30, 2019, 7 pages.
Nokia et al., "Analysis of DAPS operation," R2-1909036, 3GPP TSG RAN WG2 Meeting #107, Prague, Czech Republic, Aug. 26-30, 2019, 5 pages.
Intel Corporation et al., "Non-DC based solution for 0ms interruption time", 3GPP TSG RAN WG2 Meeting #105bis, Apr. 8-12, 2019, R2-1903447, 11 pages.
Supplementary European Search Report dated Sep. 9, 2022 in connection with European Patent Application No. 20 87 3316, 10 pages.
European Search Report dated Jun. 15, 2023, in connection with European Patent Application No. 23164437.8, 11 pages.
Nokia et al., "UE capability coordination for DAPS-RUDI handover," R2-1909312, 3GPP TSG-RAN WG2 Meeting #106, Prague, Czech Republic, Aug. 26-30, 2019, 4 pages.
Notification of the First Office Action dated Feb. 7, 2024, in connection with Chinese Application No. 202080070009.3, 18pages.
Intel Corporation, et al., "Non-DC based solution for 0ms interruption time," R2-1906281, 3GPp TSG RAN WG2 Meeting #106, Reno, USA, May 13-17-2019, 11 pages.

* cited by examiner

METHOD AND APPARATUS FOR PERFORMING HANDOVER IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2019-0122644, filed on Oct. 2, 2019, and 10-2019-0138087, filed on Oct. 31, 2019, in the Korean Intellectual Property Office, the disclosures of which are incorporated by reference herein in their entirety.

BACKGROUND

1. Field

The disclosure relates to a method and apparatus for efficiently performing handover without interruption to data transmission and reception, when handover is performed in a next-generation mobile communication system.

2. Description of Related Art

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. The 5G communication system defined by the $3^{rd}$ Generation Partnership Project (3GPP) is called a New Radio (NR) system. To achieve high data rates, implementation of 5G communication systems in an ultra-high frequency millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

SUMMARY

According to the disclosure, provided is an efficient handover method for supporting low transmission latency and a service without data interruption in a next-generation mobile communication system.

Additional aspects will be set forth in part in the description which follows and, in part, will be apparent from the description, or may be learned by practice of the presented embodiments of the disclosure.

According to an embodiment of the disclosure, a method of performing dual active protocol stack (DAPS) handover by a user equipment (UE) in a wireless communication system includes: receiving, from a source base station, a radio resource control (RRC) reconfiguration message including DAPS configuration information indicating at least one bearer for a DAPS handover; reconfiguring, for the DAPS handover, a packet data convergence protocol (PDCP) entity corresponding to the at least one bearer for the DAPS handover; and establishing protocol entities for a target cell corresponding to the at least one bearer for the DAPS handover.

According to an embodiment of the disclosure, a user equipment (UE) performing dual active protocol stack (DAPS) handover in a wireless communication system includes: a transceiver; and at least one processor connected with the transceiver and configured to: receive, from a source base station, a radio resource control (RRC) reconfiguration message including DAPS configuration information indicating at least one bearer for a DAPS handover; reconfigure, for the DAPS handover, a packet data convergence protocol (PDCP) entity corresponding to the at least one bearer for the DAPS handover; and establish protocol entities for a target cell corresponding to the at least one bearer for the DAPS handover.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
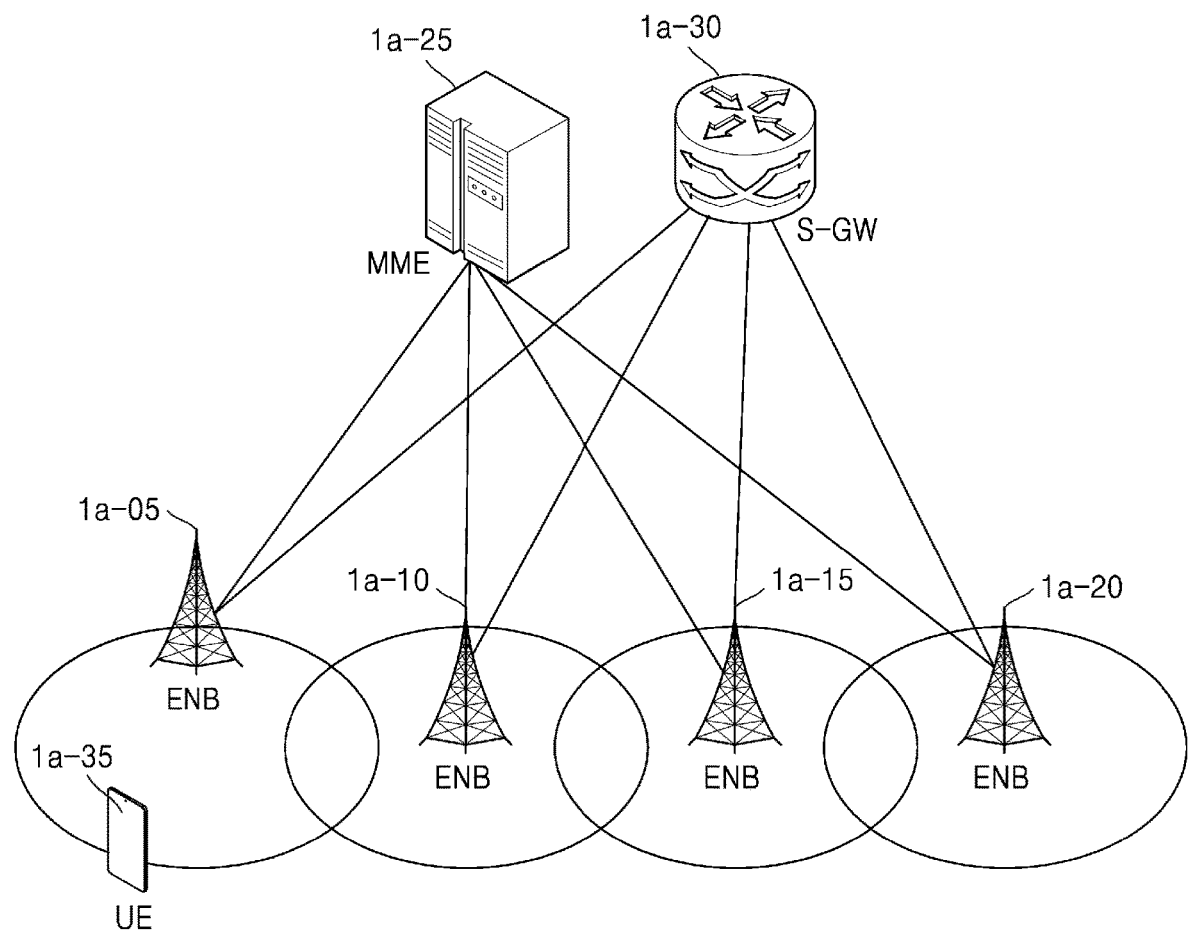
FIG. 1A is a diagram illustrating a configuration of a long term evolution (LTE) system, according to an embodiment of the disclosure.

FIGS. 1A through 1M, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

In the following descriptions of the disclosure, well-known functions or configurations are not described in detail because they would obscure the disclosure with unnecessary details. Hereinafter, embodiments of the disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of description, the disclosure uses terms and names defined in the 3$^{rd}$ Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of descriptions. That is, a BS described as an eNB may represent a gNB.

In the disclosure, provided are non-interruption handover methods capable of minimizing a data interruption time due to handover or making the data interruption time become 0 ms in a next-generation mobile communication system.

In detail, efficient handover methods provided in the disclosure may have one or more features from among a plurality of features described below.

When a UE receives a handover command message (e.g., a handover command message or a radio resource control (RRC) reconfiguration message) from a source BS, the UE performing data transmission or reception (uplink (UL) or downlink (DL) data transmission and reception) to or from the source BS via protocol layers (i.e., a physical (PHY) layer, a medium access control (MAC) layer, a radio link control (RLC) layer, and a packet data convergence protocol (PDCP) layer) of each of a plurality of first bearers, the UE may configure protocol layers of a plurality of new second bearers corresponding to (e.g., having a same bearer identifier) the protocol layers of the plurality of first bearers, and may perform data transmission or reception (UL or DL data transmission and reception) without discontinuing but maintaining data transmission or reception (UL or DL data transmission and reception) to or from the source BS via the plurality of first bearers.

After the UE receives a handover command message in the aforementioned situation, the protocol layers (a PHY layer, a MAC layer, an RLC layer, and a PDCP layer) of the plurality of second bearers that are to be newly configured are configured for data transmission and reception to and from a target BS, based on bearer configuration information or protocol layer information included in the handover command message.

In the aforementioned situation, the UE may be configured to perform data transmission or reception (UL or DL data transmission and reception) to or from the source BS via the protocol layers of the plurality of first bearers and to perform a random access procedure on the target BS via a protocol layer (e.g., the MAC layer) of the plurality of second bearers. In the aforementioned situation, the random access procedure may include transmission of a preamble, reception of a random access response, transmission of a message 3, reception of a message 4 (e.g., reception of contention resolution MAC control element (CE) or a UL transmit resource), or the like.

In the aforementioned situation, the UE may be configured to perform data transmission or reception to or from the source BS via the protocol layers of the plurality of first bearers and to complete the random access procedure on the target BS via the protocol layer (e.g., the MAC layer) of the plurality of second bearers and transmit a handover complete message to the target BS via the protocol layers of the plurality of second bearers.

In the aforementioned situation, the UE may be configured to perform data transmission or reception to or from the source BS via the protocol layers of the plurality of first bearers and to complete the random access procedure on the target BS via the protocol layer (e.g., the MAC layer) of the plurality of second bearers, transmit the handover complete message to the target BS via the protocol layers of the plurality of second bearers, and perform data transmission and reception (UL or DL).

In the aforementioned situation, the UE may be configured in such a manner that, when the UE successfully completes the random access procedure with respect to the target BS and then initially receives a UL transmit resource from the target BS, the UE discontinues data transmission to the source BS via the protocol layers of the plurality of first bearers, switches UL transmission, and then transmits data to the target BS via the plurality of second bearers.

In the aforementioned situation, the UE may be configured in such a manner that, when the UE receives a handover command message, the UE continuously performs data transmission or reception (UL or DL data transmission and reception) to or from the source BS, and performs a random access procedure on the target BS via the protocol layers of the plurality of second bearers, and when the UE successfully completes the random access procedure and then initially receives a UL transmit resource from the target BS, the UE discontinues data transmission to the source BS via the protocol layers of the plurality of first bearers, and performs UL data transmission to the target BS only via the protocol layers of the plurality of second bearers. Also, the UE may be configured to continuously receive DL data from the source BS via the protocol layers of the plurality of first bearers, and to continuously receive DL data from the target BS via the protocol layers of the plurality of second bearers.

In the aforementioned situation, a first bearer and a second bearer may constitute a second PDCP layer architecture, and in the second PDCP layer architecture, the first bearer (e.g., an RLC layer, a MAC layer, or a PHY layer) for the source BS and the second bearer (e.g., an RLC layer, a MAC layer, or a PHY layer) for the target BS are all connected to one PDCP layer, and UL data may perform transmission via one bearer from among the first bearer or the second bearer of the PDCP layer. That is, before the UE performs a random access procedure on the target BS, successfully completes the random access procedure, and initially receives a UL transmit resource from the target BS, the UE transmits UL data via the first bearer, and when the UE performs a random access procedure on the target BS, successfully completes the random access procedure, and initially receives a UL transmit resource from the target BS, the UE may discontinue data transmission via the first bearer, may switch the data transmission, and thus may transmit UL data to the target BS via the second bearer. In this regard, the UE in the second PDCP layer architecture may be configured to receive DL data from the source BS or the target BS via the first bearer or the second bearer.

Hereinafter, in the disclosure, provided are efficient handover procedures without a data interruption time, based on the aforementioned features.

FIG. 1A is a diagram illustrating a configuration of an LTE system according to an embodiment of the disclosure.

Referring to FIG. 1A, a radio access network (RAN) of the LTE system includes a plurality of evolved nodes B (eNBs) (or nodes B or base stations) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB 1a-05, 1a-10, 1a-15, or 1a-20 may be connected to the UE 1a-35 through wireless channels and may perform complex functions compared to the existing node B. All user traffic data including real-time services such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology such as orthogonal frequency division multiplexing (OFDM) at a bandwidth of 20 MHz to achieve a data rate of 100 Mbps. Adaptive modulation & coding (AMC) may be used to determine a modulation scheme and a channel coding rate in accordance with a channel state of a UE. The S-GW 1a-30 is an entity for providing data bearers and may establish and release the data bearers by the control of the MME 1a-25. The MME 1a-25 is an entity for performing a mobility management function and various control functions on the UE 1a-35 and is connected to the plurality of eNBs 1a-05, 1a-10, 1a-15, and 1a-20.

Figure 1B:
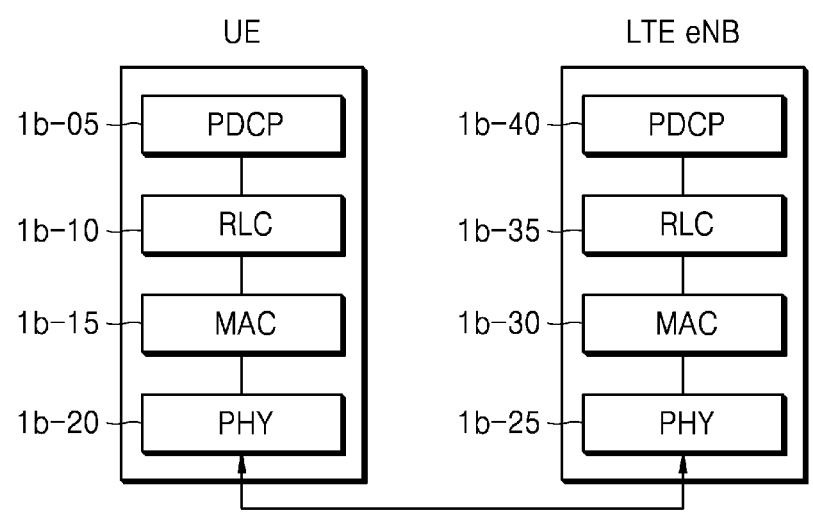
FIG. 1B is a diagram illustrating a radio protocol architecture of an LTE system, according to an embodiment of the disclosure.

FIG. 1B is a diagram illustrating a radio protocol architecture of an LTE system according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and medium access control (MAC) layers 1b-15 and 1b-30 respectively for a UE and an eNB. The PDCP layer 1b-05 or 1b-40 may perform, for example, IP header compression/decompression. Main functions of the PDCP layer 1b-05 or 1b-40 are summarized as shown below.

Header compression and decompression: robust header compression (ROHC) only
Transfer of user data
In-sequence delivery of upper layer packet data units (PDUs) at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 may perform an automatic repeat request (ARQ) operation by reconfiguring packet data convergence protocol packet data units (PDCP PDUs) to appropriate sizes. Main functions of the RLC layer 1b-10 or 1b-35 may be summarized as shown below.

Transfer of upper layer PDUs
Error correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below.

Mapping between logical channels and transport channels
Multiplexing/demultiplexing of MAC SDUs belonging to one or different logical channels into/from transport blocks (TBs) delivered to/from the physical layer on transport channels
Scheduling information reporting
Error correction through hybrid ARQ (HARD)
Priority handling between logical channels of one UE
Priority handling between UEs by means of dynamic scheduling
Multimedia broadcast/multicast service (MBMS) service identification
Transport format selection
Padding A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1C:
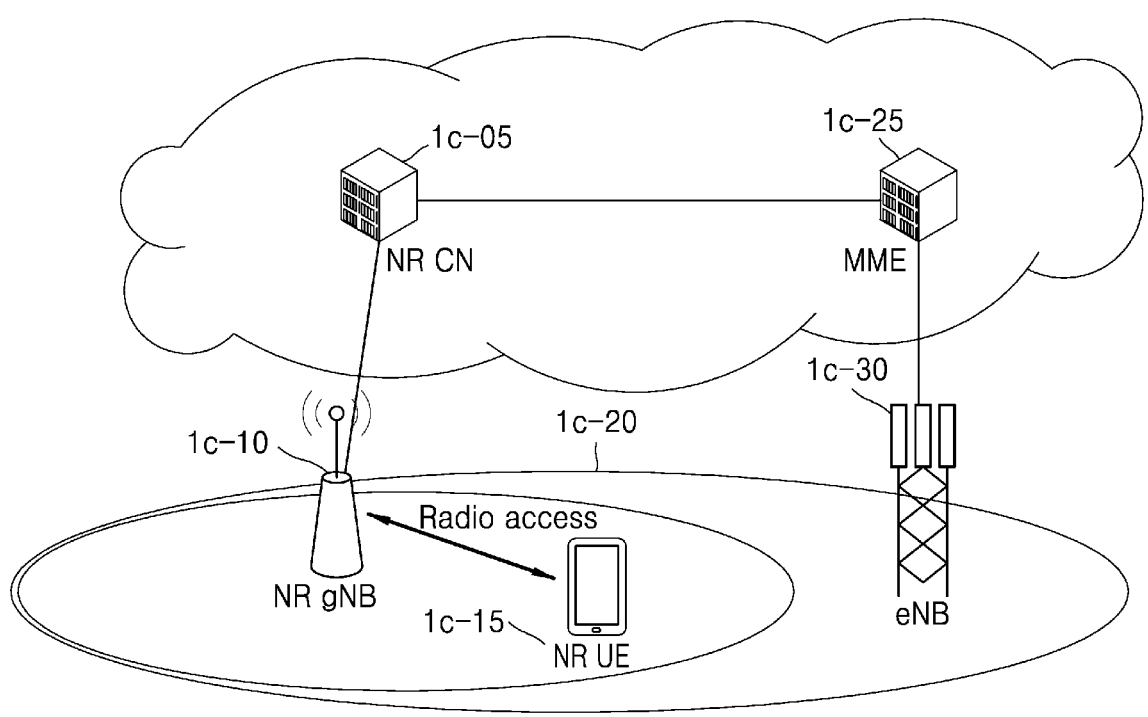
FIG. 1C is a diagram illustrating a next-generation mobile communication system, according to an embodiment of the disclosure.

FIG. 1C is a diagram illustrating a next-generation mobile communication system, according to an embodiment of the disclosure.

Referring to FIG. 1C, as illustrated, a radio access network of the next-generation mobile communication system (hereinafter, referred to as the NR or 5G communication system) includes a new radio node B (NR gNB, NR NB, or gNB) 1c-10 and a new radio core network (NR CN) 1c-05. A NR UE (or terminal) 1c-15 accesses an external network via the NR gNB 1c-10 and the NR CN 1c-05.

In FIG. 1C, the NR gNB 1c-10 corresponds to an eNB of a legacy LTE system. The NR gNB 1c-10 may be connected to the NR UE 1c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. Also, the NR gNB 1c-10 uses AMC to determine a modulation scheme and a channel coding rate in accordance with a channel state of the NR UE 1c-15. The NR CN 1c-05 performs functions such as mobility support, bearer configuration, and quality of service (QoS) configuration. The NR CN 1c-05 is an entity for performing a mobility management function and various control functions on the NR UE 1c-15 and is connected to a plurality of base stations. The NR or 5G mobile communication system may cooperate with the existing LTE system, and the NR CN 1c-05 may be connected to an MME 1c-25 through a network interface. The MME 1c-25 is connected to an eNB 1c-30 that is an existing base station.

Figure 1D:
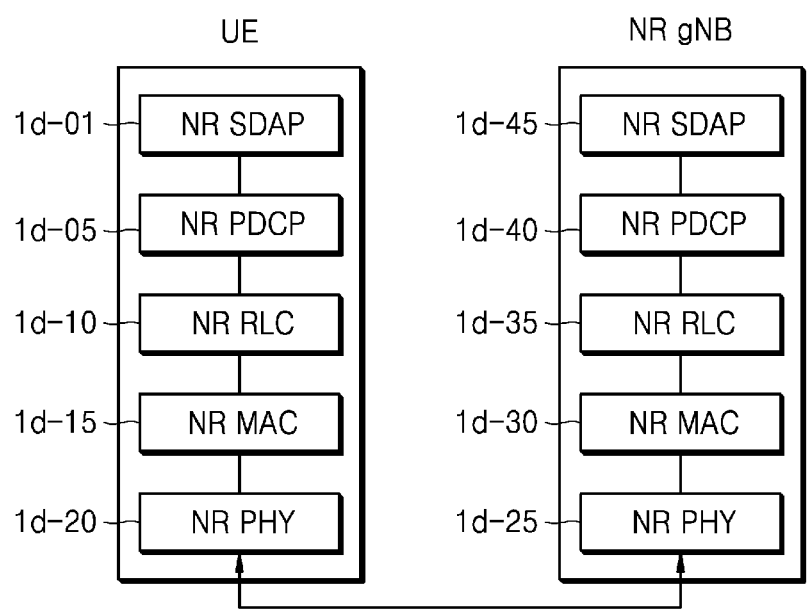
FIG. 1D is a diagram illustrating a radio protocol architecture of a new radio (NR) or $5^{th}$ generation (5G) mobile communication system, according to an embodiment of the disclosure.

FIG. 1D is a diagram illustrating a radio protocol architecture of a NR or 5G mobile communication system according to an embodiment of the disclosure.

Referring to FIG. 1D, the radio protocol architecture of the NR or 5G mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.
 Transfer of user plane data
 Mapping between a QoS flow and a data radio bearer (DRB) for both DL and UL
 Marking QoS flow identifier (ID) in both DL and UL packets
 Reflective QoS flow to DRB mapping for the UL SDAP PDUs With regard to an SDAP layer, the UE may be configured, through an RRC message, whether to use a header of the SDAP layer or to use functions of the SDAP layer per PDCP layer, per bearer, or per logical channel. When the SDAP header is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for appropriately supporting a service.

Main functions of the NR PDCP layer 1d-05 or 1d-40 may include some of the following functions.
 Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink The reordering function of the NR PDCP layer 1d-05 or 1d-40 may indicate a function of reordering PDCP PDUs received from a lower layer, on a PDCP sequence number (SN) basis. The reordering function may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 1d-10 or 1d-35 may include some of the following functions.
 Transfer of upper layer PDUs
 In-sequence delivery of upper layer PDUs
 Out-of-sequence delivery of upper layer PDUs
 Error correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment The in-sequence delivery function of the NR RLC layer 1d-10 or 1d-35 may indicate a function of delivering RLC SDUs received from a lower layer, to an upper layer in order. The in-sequence delivery function may include a function of reassembling the RLC SDUs and delivering the reassembled RLC SDU when a plurality of RLC SDUs segmented from one RLC SDU are received, a function of reordering received RLC PDUs on an RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received up to a current time, to an upper layer in order when a certain timer expires, even when a missing RLC SDU exists. The NR RLC layer 1d-10 or 1d-35 may process the RLC PDUs in order of reception and deliver the RLC PDUs to the NR PDCP layer 1d-05 or 1d-40 regardless of SNs (out-of-sequence delivery), and when a segment is received, the NR RLC layer 1d-10 or 1d-35 may reassemble the segment with other segments stored in a buffer or subsequently received, into a whole RLC PDU and may deliver the RLC PDU to the NR PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery function of the NR RLC layer 1d-10 or 1d-35 may include a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer 1d-15 or 1d-30 may include some of the following functions.
 Mapping between logical channels and transport channels
 Multiplexing/demultiplexing of MAC SDUs
 Scheduling information reporting
 Error correction through HARQ
 Priority handling between logical channels of one UE
 Priority handling between UEs by means of dynamic scheduling
 MBMS service identification
 Transport format selection
 Padding An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 1E:
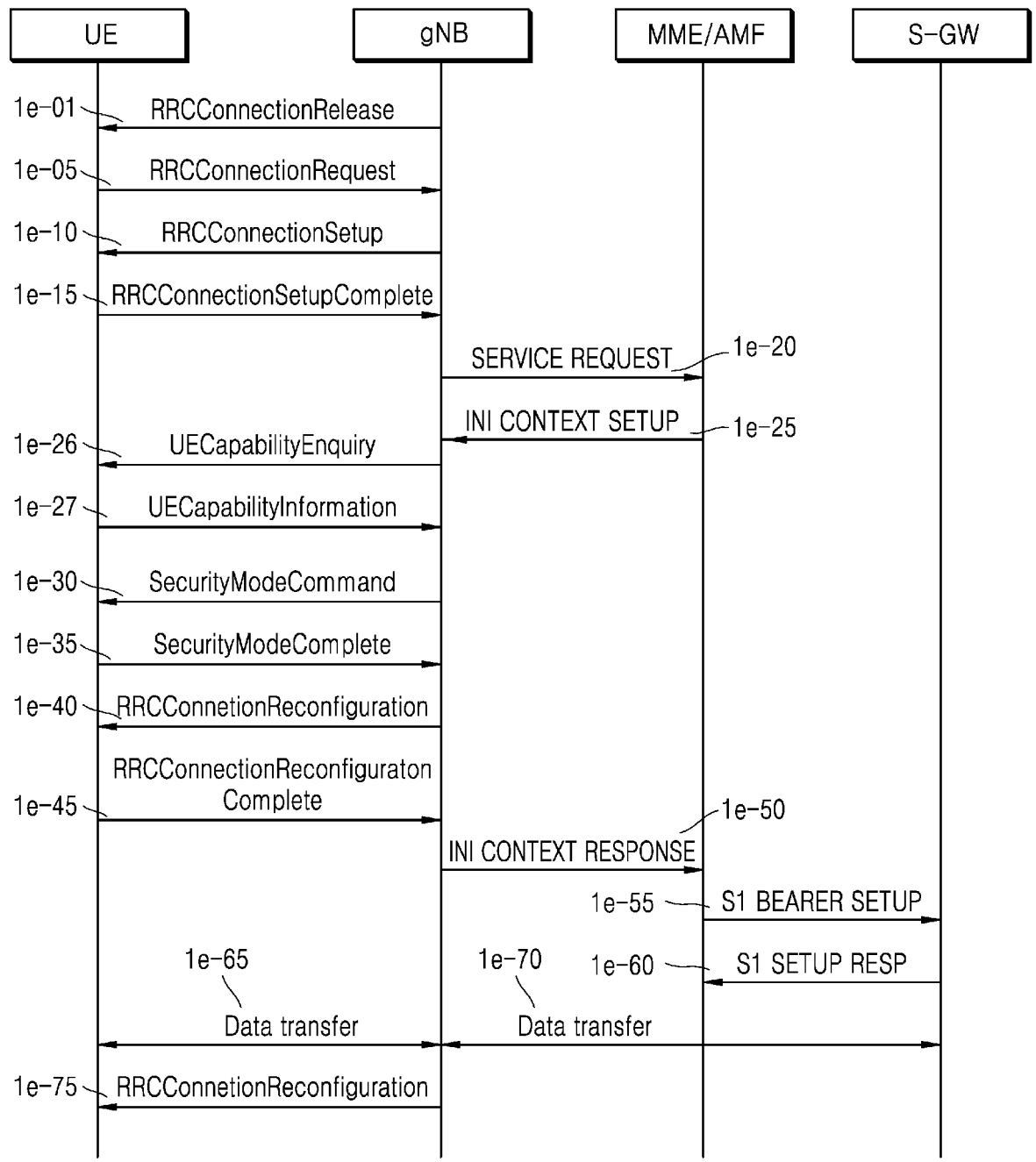
FIG. 1E is a diagram for describing procedures in which a user equipment (UE) switches a radio resource control (RRC) idle mode to an RRC connected mode and establishes connection with a network, according to an embodiment of the disclosure.

FIG. 1E is a diagram for describing procedures in which a UE switches an RRC idle mode to an RRC connected mode and establishes connection with a network according to an embodiment of the disclosure.

Referring to FIG. 1E, when the UE configured to transmit and receive data in an RRC connected mode does not transmit or receive data due to a predefined reason or for a predefined time, a gNB may transmit an RRCConnectionRelease message to the UE so as to allow the UE to transit to an RRC idle mode (operation 1e-01). Afterward, when the UE that is not currently configured for connection (hereinafter, also referred to as the idle-mode UE) has data to be transmitted, the UE may perform an RRC connection establishment procedure on the gNB. The UE establishes inverse direction transmission synchronization with the gNB through a random access procedure and transmits an RRCConnectionRequest message to the gNB (operation 1e-05). The RRCConnectionRequest message may include an identifier of the UE, an establishment cause or the like. The gNB transmits an RRCConnectionSetup message to allow the UE to establish RRC connection (operation 1e-10).

The RRCConnectionSetup message includes configuration information for each service/bearer/RLC layer or each logical channel or each bearer, and PDCP layer configuration information (pdcp-config) may include information about whether to use ROHC for each bearer/logical channel, ROHC configuration information (e.g., an ROHC version, initial information, etc.), statusReportRequired information (information with which a BS indicates a PDCP Status report to a UE), and drb-ContinueROHC information (configuration information indicating to continue and changelessly use ROHC configuration information) and may be transmitted. Also, the RRCConnectionSetup may include RRC connection configuration information. A bearer for RRC connection is called a signaling radio bearer (SRB) and is used in transmission and reception of an RRC message that is a control message between the UE and the gNB.

The UE that established the RRC connection transmits an RRCConnectionSetupComplete message to the gNB (operation 1e-15). The RRCConnectionSetupComplete message may include a control message such as a SERVICE REQUEST message for requesting, by the UE, an MME or an access and mobility management function (AMF) to configure a bearer for a certain service. The gNB transmits the SERVICE REQUEST message included in the RRCConnectionSetupComplete message to the MME or the AMF (operation 1e-20), and the MME or the AMF may determine whether to provide the service requested by the UE. As a result of the determination, when the service requested by the UE is to be provided, the MME or the AMF transmits an INITIAL CONTEXT SETUP REQUEST message to the gNB (operation 1e-25). The INITIAL CONTEXT SETUP REQUEST message may include QoS information to be applied in configuring a DRB, security information (e.g., a security key, a security algorithm, or the like) to be applied to the DRB, or the like.

When the gNB does not receive UE capability information from the MME or the AMF, the gNB may transmit a UE capability information request message to the UE so as to check the UE capability information (operation 1e-26). When the UE receives the UE capability information request message, the UE may configure, generate, and report a UE capability information message to the gNB (operation 1e-27). The UE capability information may include information about which types of handover methods are supported by the UE. For example, the UE may report information about a UE capability to the gNB via an indicator, the information indicating whether or not the UE supports an efficient handover method (i.e., a dual active protocol stack (DAPS) handover method) provided in the disclosure. The gNB checks the UE capability information and then indicates handover to the UE. The gNB may indicate the handover by defining an indicator indicating handover in a handover command message, according to each of handover methods. For example, the gNB may indicate the efficient handover method (the DAPS handover method) provided in the disclosure to the UE or may configure the DAPS handover method to the UE according to each bearer (a DRB or an SRB). When the gNB configures the DAPS handover method to the UE, the gNB also indicates other handover methods (e.g., a conditional handover method (configurations of a plurality of target cells and a plurality of conditions are configured to the UE, and when the UE satisfies the conditions in a cell selection procedure or a cell reselection procedure, the UE performs a handover procedure on one target cell) or a handover method without a random access procedure), thereby preventing data loss or a transmission delay which may occur in handover. The UE may perform a handover procedure on a target gNB according to the handover method indicated in the handover command message.

To configure security with the UE, the gNB exchanges a SecurityModeCommand message (operation 1e-30) and a SecurityModeComplete message (operation 1e-35). When security configuration is complete, the gNB transmits an RRCConnectionReconfiguration message to the UE (operation 1e-40).

The RRCConnectionReconfiguration message includes configuration information for each service/bearer/RLC layer or each logical channel or each bearer, and PDCP layer configuration information (pdcp-config) may include information about whether to use ROHC for each bearer/logical channel, ROHC configuration information (e.g., an ROHC version, initial information, etc.), statusReportRequired information (information with which a BS indicates a PDCP Status report to a UE), and drb-ContinueROHC information (configuration information indicating to continue and changelessly use ROHC configuration information) and may be transmitted. Also, the RRCConnectionReconfiguration may include RRC connection configuration information. A bearer for RRC connection is called an SRB and is used in transmission and reception of an RRC message that is a control message between the UE and the gNB.

The RRCConnectionReconfiguration message includes configuration information of a DRB in which user data is to be processed, and the UE configures the DRB by using the configuration information of the DRB and transmits an RRCConnectionReconfigurationComplete message to the gNB (operation 1e-45). When configuration of the DRB with respect to the UE is complete, the gNB transmits an INITIAL CONTEXT SETUP COMPLETE message to the MME or the AMF (operation 1e-50), and upon reception, the MME or the AMF may exchange an S1 BEARER SETUP message and an S1 BEARER SETUP RESPONSE message with an S-GW to configure an S1 bearer (operations 1e-55 and 1e-60). The S1 bearer is a connection for data transmission, which is configured between the S-GW and the eNB and corresponds to the DRB in a one-to-one manner. After the above procedures are completed, the UE may transmit or receive data to or from the gNB through the S-GW (operations 1e-65 and 1e-70). As such, general data transmission processes largely include three steps of RRC connection establishment, security setting, and DRB configuration. Also, the gNB may transmit, to the UE, an RRCConnectionReconfiguration message to renew, add, or change the configuration for a certain reason (operation 1e-75).

In the disclosure, a bearer may include an SRB and a DRB where the SRB stands for a signaling radio bearer and the DRB stands for a data radio bearer. The SRB is mainly used to transmit and receive an RRC message of an RRC layer, and the DRB is mainly used to transmit and receive a plurality of items of user plane data. An UM DRB indicates a DRB configured to use an RLC layer operating in an unacknowledged mode (UM), and an acknowledged mode (AM) DRB indicates a DRB configured to use an RLC layer operating in an AM.

Figure 1F:
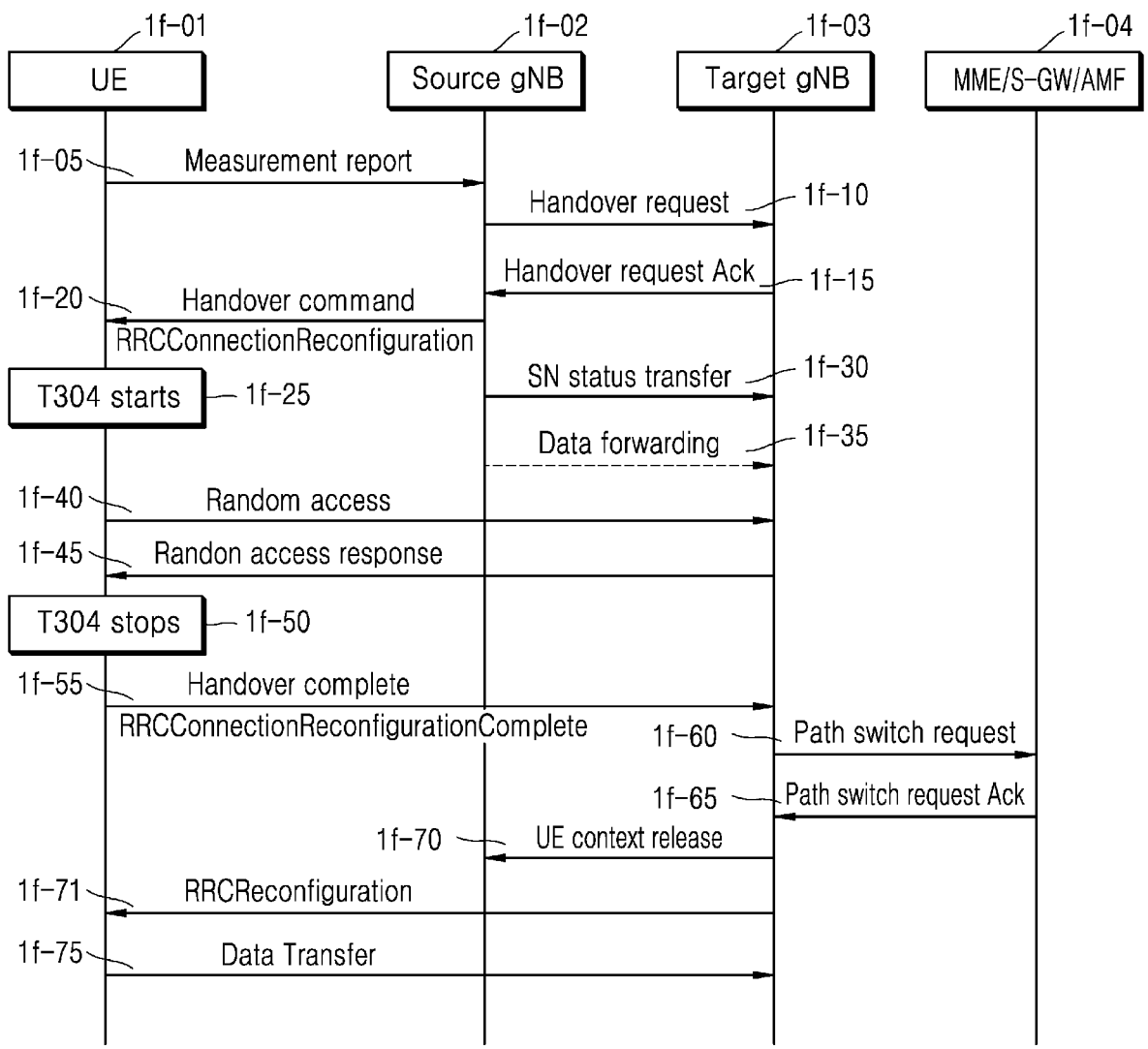
FIG. 1F is a diagram illustrating signaling procedures for performing handover in a next-generation mobile communication system, according to an embodiment of the disclosure.

FIG. 1F is a diagram illustrating signaling procedures for performing handover in a next-generation mobile communication system according to an embodiment of the disclosure.

A UE 1f-01 in an RRC connected mode state reports a cell measurement report to a current source gNB 1f-02 in a periodic manner or when a particular event is satisfied (operation 1f-05). The source gNB 1f-02 determines, based on the cell measurement report, whether the UE 1f-01 is to perform handover to an adjacent cell. The handover refers to a technology of switching a source BS to another BS (or another cell in a same BS), the source BS providing a service to a UE in a connected mode state. When the source gNB 1f-02 determines handover, the source gNB 1f-02 requests the handover by transmitting a handover request message (e.g., a handover preparation information message) to a target gNB 1f-03 that is a new BS to provide a service to the UE 1f-01 (operation 1f-10). When the target gNB 1f-03 accepts the handover request, the target gNB 1f-03 transmits a handover request acknowledgement (Ack) message (e.g., a handover command message) to the source gNB 1f-02 (operation 1f-15). Upon receiving the message, the source gNB 1f-02 transmits, to the UE 1f-01, the handover command message (an RRCReconfiguration message included in a Dedicated Control Channel (DCCH) of the handover request Ack message) (operation 1f-20). The source gNB 1f-02 extracts the handover command message from a message received from the target gNB 1f-03 and transmits the handover command message to the UE 1f-01 by using an RRC Connection Reconfiguration message (operation 1f-20).

In the disclosure, provided is a method of determining an efficient DAPS handover method by using two messages (i.e., a handover preparation information message (operation 1f-10) and a handover command message (operation 1f-15)) when the source gNB 1f-02 transmits the handover preparation information message (operation 1f-10), and in response thereto, the target gNB 1f-03 transmits the handover command message (operation 1f-15) to the source gNB 1f-02.

Embodiment 1 of determining an efficient DAPS handover method, which is provided in the disclosure, will now be described.

In embodiment 1 of the disclosure, an entity for determining a DAPS handover method may be a source BS. Also, in embodiment 1 of the disclosure, in a case where the source BS requests a target BS for the DAPS handover method, the target BS may always indicate or perform the DAPS handover method.

The source BS may indicate, to the target BS and by defining a new indicator in the handover preparation information message, that the source BS is to perform the DAPS handover method provided in the disclosure, and may request the DAPS handover method. The handover preparation information message may include current bearer configuration information of a UE, security key information, cell group configuration information, UE capability information, or the like. The source BS is configured to pre-share a capability of the target BS and thus may know in advance whether the target BS supports the DAPS handover method. The source BS may indicate, to the target BS, that the source BS is to perform the DAPS handover method, may indicate, to the target BS, that the source BS may perform early data forwarding fast or in advance, and may indicate the target BS to prepare to receive data forwarding and perform processing. The source BS may indicate a request for the DAPS handover method for each bearer (a DRB or an SRB).

In a case where the target BS receives the handover preparation information message and identifies that an indicator requesting the DAPS handover method is included therein, when the target BS configures an RRCReconfiguration message to indicate handover to the UE, the target BS may add, to the RRCReconfiguration message, an indicator requesting the DAPS handover method, bearer configuration information required for the UE to perform the DAPS handover method, bearer configuration information, security key information, cell group configuration information, or system information. Also, the target BS may add the RRCReconfiguration message to a DL-DCCH message of a handover command message and may transmit the handover command message to the source BS. The target BS may perform indication of the DAPS handover method with respect to each bearer (a DRB or an SRB).

When the source BS receives the handover command message, the source BS may extract the RRCReconfiguration message included in the handover command message, may transmit the RRCReconfiguration message to the UE, and thus may indicate handover. The source BS may identify the indicated DAPS handover method for each bearer and may perform the DAPS handover method for each bearer (a DRB or an SRB).

Embodiment 2 of determining an efficient DAPS handover method, which is provided in the disclosure, will now be described.

In embodiment 2 of the disclosure, an entity for determining a DAPS handover method may be a target BS. Also, in embodiment 2 of the disclosure, in a case where a source BS requests the target BS for the DAPS handover method, the target BS may reject or accept the request from the source BS or may indicate another handover method to the source BS via a handover command message indicating the other handover method.

The source BS may indicate, to the target BS and by defining a new indicator in the handover preparation information message, that the source BS is to perform the DAPS handover method provided in the disclosure, and may request the DAPS handover method. The handover preparation information message may include current bearer configuration information of a UE, security key information, cell group configuration information, UE capability information, or the like. The source BS is configured to pre-share a capability of the target BS and thus may know in advance whether the target BS supports the DAPS handover method. The source BS may indicate, to the target BS, that the source BS is to perform the DAPS handover method, may indicate, to the target BS, that the source BS may perform early data forwarding, and may indicate the target BS to prepare to receive data forwarding and perform processing. The source BS may indicate a request for the DAPS handover method for each bearer (a DRB or an SRB).

In a case where the target BS receives the handover preparation information message and identifies that an indicator requesting the DAPS handover method is included therein, the target BS may reject or accept the request for the DAPS handover method from the source BS or may indicate another handover method to the source BS, based on whether the target BS can support the DAPS handover method, an amount of current transmit resources, or scheduling. The target BS may add, to a handover command message, an indicator to reject the request for the DAPS handover method, an indicator to accept the request for the DAPS handover method, or an indicator to indicate the other handover method, and may transmit the handover command message. In a case where the target BS configures an RRCReconfiguration message to indicate handover to the UE, the target BS may configure the RRCReconfiguration message in such a manner that the RRCReconfiguration message includes the indicator indicating the DAPS handover method when the DAPS handover request is accepted or the RRCReconfiguration message includes the indicator indicating the other handover method when the DAPS handover request is rejected, and the RRCReconfiguration message includes bearer configuration information necessary for the UE to perform the DAPS handover method or the other handover method, bearer configuration information, security key information, cell group configuration information, or system information. Also, the target BS may add the RRCReconfiguration message to a DL-DCCH message of a handover command message and may transmit the handover command message to the source BS. The target BS may perform indication of the DAPS handover method with respect to each bearer (a DRB or an SRB).

When the source BS receives the handover command message, the source BS may check an indicator included in the handover command message and thus may identify whether the request for the DAPS handover method is accepted or rejected. When the request for the DAPS handover method is accepted, the source BS may perform the DAPS handover method, may extract the RRCReconfiguration message included in the handover command message, may transmit the RRCReconfiguration message to the UE, and thus may indicate handover. When the source BS checks the indicator included in the handover command message, when the request for the DAPS handover method is rejected or the other handover message is indicated, the source BS may perform the other handover method indicated by the target BS. Also, the source BS may extract the RRCReconfiguration message included in the handover command message, may transmit the RRCReconfiguration message to the UE, and thus may indicate handover. As another method, when a separate indicator is not present in the handover command message, the source BS may check a type of a handover message indicated by the target BS by reading the RRCReconfiguration message included in the handover command message, and may identify whether the request for the DAPS handover method is accepted or rejected. The source BS may perform a handover method (e.g., the DAPS handover method or another handover method) indicated in the RRCReconfiguration message. The source BS may identify the indicated DAPS handover method for each bearer and may perform the DAPS handover method for each bearer (a DRB or an SRB).

Embodiment 3 of determining an efficient DAPS handover method, which is provided in the disclosure, will now be described.

In embodiment 3 of the disclosure, an entity for determining a DAPS handover method may be a target BS. Also, in embodiment 3 of the disclosure, the target BS may check capability of a UE, and may determine a handover method (e.g., a DAPS handover method) based on whether the target BS can support the DAPS handover method, an amount of current transmit resources, or scheduling.

A source BS may add, to a handover preparation information message, current bearer configuration information of a UE, security key information, cell group configuration information, UE capability information, or the like, and may transmit the handover preparation information message to request the target BS for handover. The source BS is configured to pre-share a capability of the target BS and thus may know in advance whether the target BS supports the DAPS handover method. When the target BS indicates to perform the DAPS handover method, the source BS may perform early data forwarding fast or in advance.

The target BS may receive the handover preparation information message, and may determine the handover method (e.g., the DAPS handover method) based on UE capability information, whether the target BS can support the DAPS handover method, an amount of current transmit resources, or scheduling. When the target BS determines the DAPS handover method, the target BS may add, to the handover command message, an indicator indicating the DAPS handover method, and may transmit the handover command message. In a case where the target BS configures an RRCReconfiguration message to indicate handover to the UE, the target BS may configure the RRCReconfiguration message in such a manner that the RRCReconfiguration message includes the indicator indicating the DAPS handover method when the DAPS handover request is determined or the RRCReconfiguration message includes the indicator indicating the other handover method when the DAPS handover request is determined, and the RRCReconfiguration message includes bearer configuration information necessary for the UE to perform the DAPS handover method or the other handover method, bearer configuration information, security key information, cell group configuration information, or system information. Also, the target BS may add the RRCReconfiguration message to a DL-DCCH message of a handover command message and may transmit the handover command message to the source BS. The target BS may perform indication of the DAPS handover method with respect to each bearer (a DRB or an SRB).

When the source BS receives the handover command message, the source BS may check an indicator included in the handover command message and thus may identify whether the DAPS handover method is determined. When the DAPS handover method is indicated, the source BS may perform the DAPS handover method, may extract the RRCReconfiguration message included in the handover command message, may transmit the RRCReconfiguration message to the UE, and thus may indicate handover. When the source BS checks the indicator included in the handover command message, when the DAPS handover method is not determined or the other handover message is indicated, the source BS may perform the other handover method indicated by the target BS. Also, the source BS may extract the RRCReconfiguration message included in the handover command message, may transmit the RRCReconfiguration message to the UE, and thus may indicate handover. As another method, when a separate indicator is not present in the handover command message, the source BS may check a type of a handover message indicated by the target BS by reading the RRCReconfiguration message included in the handover command message, and may identify whether the DAPS handover method is determined. When the other handover method is indicated, the source BS may perform the indicated other handover method. The source BS may identify the indicated DAPS handover method for each bearer and may perform the DAPS handover method for each bearer (a DRB or an SRB).

A new embodiment may be derived by combining methods of embodiment 1, embodiment 2, or embodiment 3 of determining an efficient DAPS handover method.

According to an embodiment of the disclosure, a BS may indicate, via the RRCReconfiguration message, an efficient handover method (the DAPS handover method) provided in the disclosure to the UE, or in another method, the BS may configure the DAPS handover method for each bearer (a DRB or an SRB) of the UE. For example, a new indicator indicating bearer configuration information, DPC PDCP configuration information or RLC configuration information for each bearer identifier or each logical channel identifier may be defined in the RRCReconfiguration message, and the BS may indicate, by using the new identifier, an efficient handover message for each bearer or logical channel identifier to the UE. When the BS configures the DAPS handover method to the UE, the BS also indicates other handover methods (e.g., a conditional handover method (configurations of a plurality of target cells and a plurality of conditions are configured to the UE, and when the UE satisfies the conditions in a cell selection procedure or a cell reselection procedure, the UE performs a handover procedure on one target cell) or a handover method without a random access procedure), thereby preventing data loss or a transmission delay which may occur in handover.

When the UE 1f-01 receives the RRCReconfiguration message, the UE 1f-01 discontinues or continues data transmission and reception to and from the source gNB 1f-02 by using the configured handover method and starts T304 timer. When the UE 1f-01 cannot succeed in handover to the target gNB 1f-03 for a preset time (e.g., when T304 timer is expired), T304 timer returns the UE 1f-01 to original configuration of the UE 1f-01, and allows the UE 1f-01 to transition to an RRC idle state. Also, the UE 1f-01 can trigger an RRC connection re-establishment procedure, and when an efficient handover method is configured and connection to the source gNB 1f-02 is active, the UE 1f-01 may fall back and report a handover failure of the UE to the source gNB 1f-02. The source gNB 1f-02 provides a sequence number (SN) status of UL/DL data for each bearer (e.g., for each RLC UM bearer or each RLC AM bearer), and when DL data or UL data is present, the source gNB 1f-02 transmits the DL data or the UL data to the target gNB 1f-03 (operations 1f-30 and 1f-35). The UE 1f-01 attempts a random access to a target cell indicated by the source gNB 1f-02 (operation 1f-40). The UE 1f-01 performs the random access to notify switching of the UE 1f-01 to the target cell and simultaneously to match UL synchronization, via the handover. For the random access, the UE 1f-01 transmits, to the target cell, a preamble that corresponds to a preamble ID provided by the source gNB 1f-02 or corresponds to a randomly-selected preamble. After the preamble is transmitted and then a particular number of subframes are transmitted, the UE 1f-01 monitors whether a random access response (RAR) message is transmitted from the target cell. A time interval for monitoring the RAR message is called an RAR window. When the RAR message is received during the RAR window (operation 1f-45), the UE 1f-01 transmits a handover complete message in an RRC reconfiguration complete message to the target gNB 1f-03 (operation 1f-55). When the UE 1f-01 successfully receives the RAR message from the target gNB 1f-03, the UE 1f-01 ends T304 timer (operation 1f-50).

To switch a path of bearers which is configured for the source gNB 1f-02, the target gNB 1f-03 requests a core network 1f-04 (e.g., MME/S-GW/AMF) for a path switch of the bearers (operations 1f-60 and 1f-65), and indicates the source gNB 1f-02 to discard UE context of the UE 1f-01 (operation 1f-70). The target gNB 1f-03 may transmit an RRC message (e.g., an RRCReconfiguration message 1f-71) to the UE 1f-01 and may indicate, by using an indicator, the UE 1f-01 to release connection with the source gNB 1f-02. As another method, the target gNB 1f-03 may transmit MAC control information, RLC control information, or PDCP control information to the UE 1f-01 and thus may indicate the UE 1f-01 to release connection with the source gNB 1f-02. The UE 1f-01 attempts, at a start point of the RAR window, to receive data from the target gNB 1f-03, and after the RAR message is received, the UE 1f-01 transmits the RRC reconfiguration complete message and receives a DL transmit resource or a UL transmit resource, thereby starting data transmission and reception to and from the target gNB 1f-03.

Hereinafter, in the disclosure, provided are non-interruptive handover methods capable of allowing a data interruption time to be 0 ms or minimizing the data interruption time due to handover in a next-generation mobile communication system.

A UE may configure a plurality of first bearers with a source BS and may perform data transmission and reception (UL or DL data transmission and reception) via protocol layers (a PHY layer, a MAC layer, an RLC layer, a PDCP layer or the like) of each of the plurality of first bearers, and in the disclosure, for convenience of description, it is assumed, in drawings and descriptions, that the UE has one bearer.

Figure 1G:
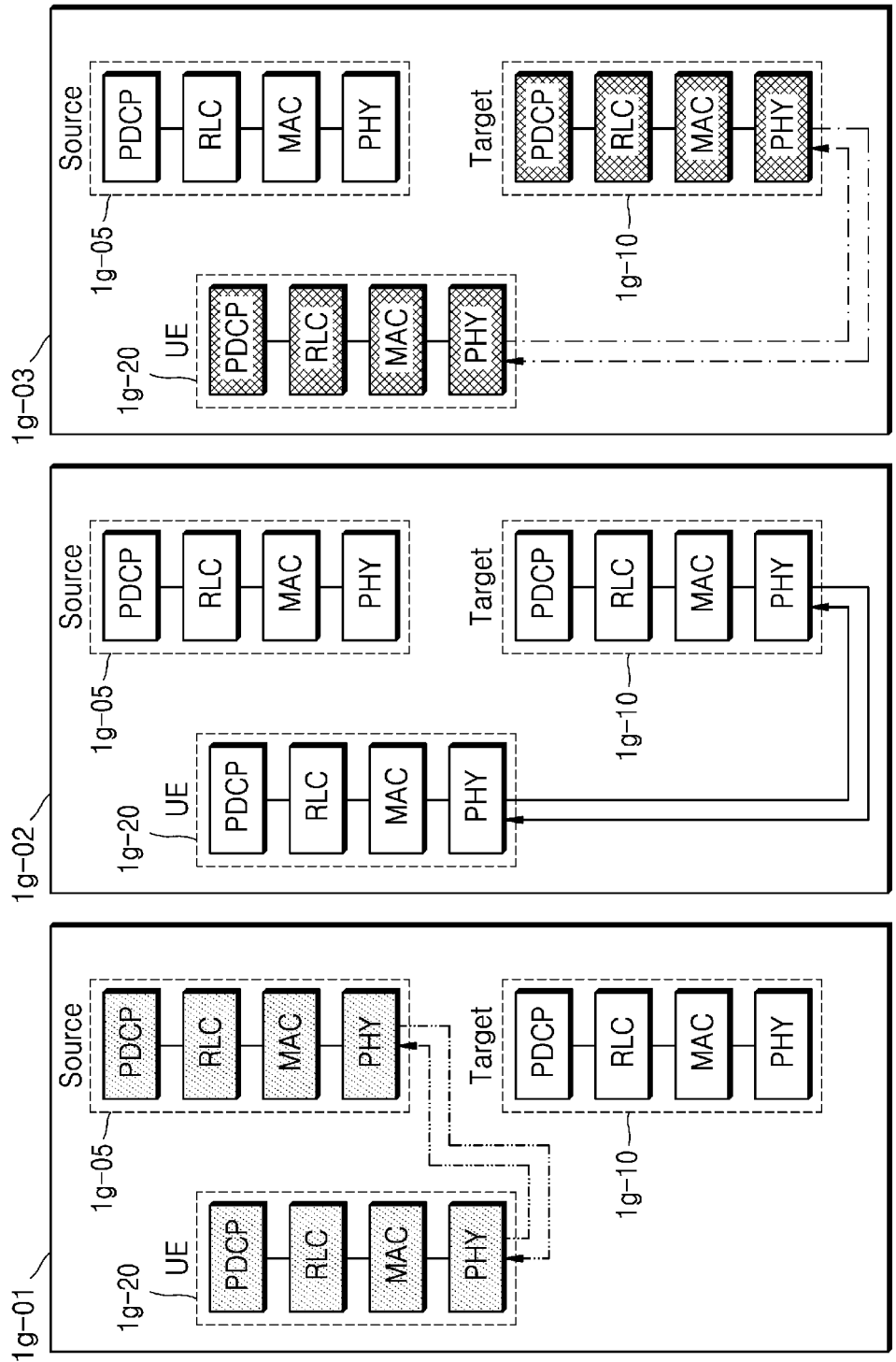
FIG. 1G illustrates particular operations of embodiment 1 of the efficient handover method for minimizing a data interruption time due to handover, according to an embodiment of the disclosure.

FIG. 1G illustrates particular operations of embodiment 1 of the efficient handover method for minimizing a data interruption time due to handover according to an embodiment of the disclosure.

According to an embodiment of the disclosure, in embodiment 1 of the efficient handover method of FIG. 1G, when a UE 1g-20 transmits or receives data to or from a source BS 1g-05 in first operation 1g-01 and then receives a handover command message, the UE 1g-20, based on a handover method indicated by the handover command message (e.g., an RRCReconfiguration message), may release connection with the source BS 1g-05, may perform a random access procedure on a target BS 1g-10, and may perform a handover procedure. As another method, to minimize a data interruption time occurring in handover based on the indicated handover method, the UE 1g-20 may continuously transmit and receive data to and from the source BS 1g-05.

According to an embodiment of the disclosure, in second operation 1g-02, when the UE 1g-20 performs the random access procedure on the target BS 1g-10 by using the handover method indicated by the handover command message received from the source BS 1g-05, transmits a preamble to the target BS 1g-10, or initially transmits data in a UL transmit resource by using a PUCCH or PUSCH transmit resource, the UE 1g-20 may discontinue data transmission and reception (UL data transmission and DL data reception) to and from the source BS 1g-05.

According to an embodiment of the disclosure, in third operation 1g-03, the UE 1g-20 may complete the random access procedure with respect to the target BS 1g-10, may transmit a handover complete message to the target BS 1g-10, and may start data transmission and reception (UL data transmission and DL data reception) to and from the target BS 1g-10.

Figure 1H:
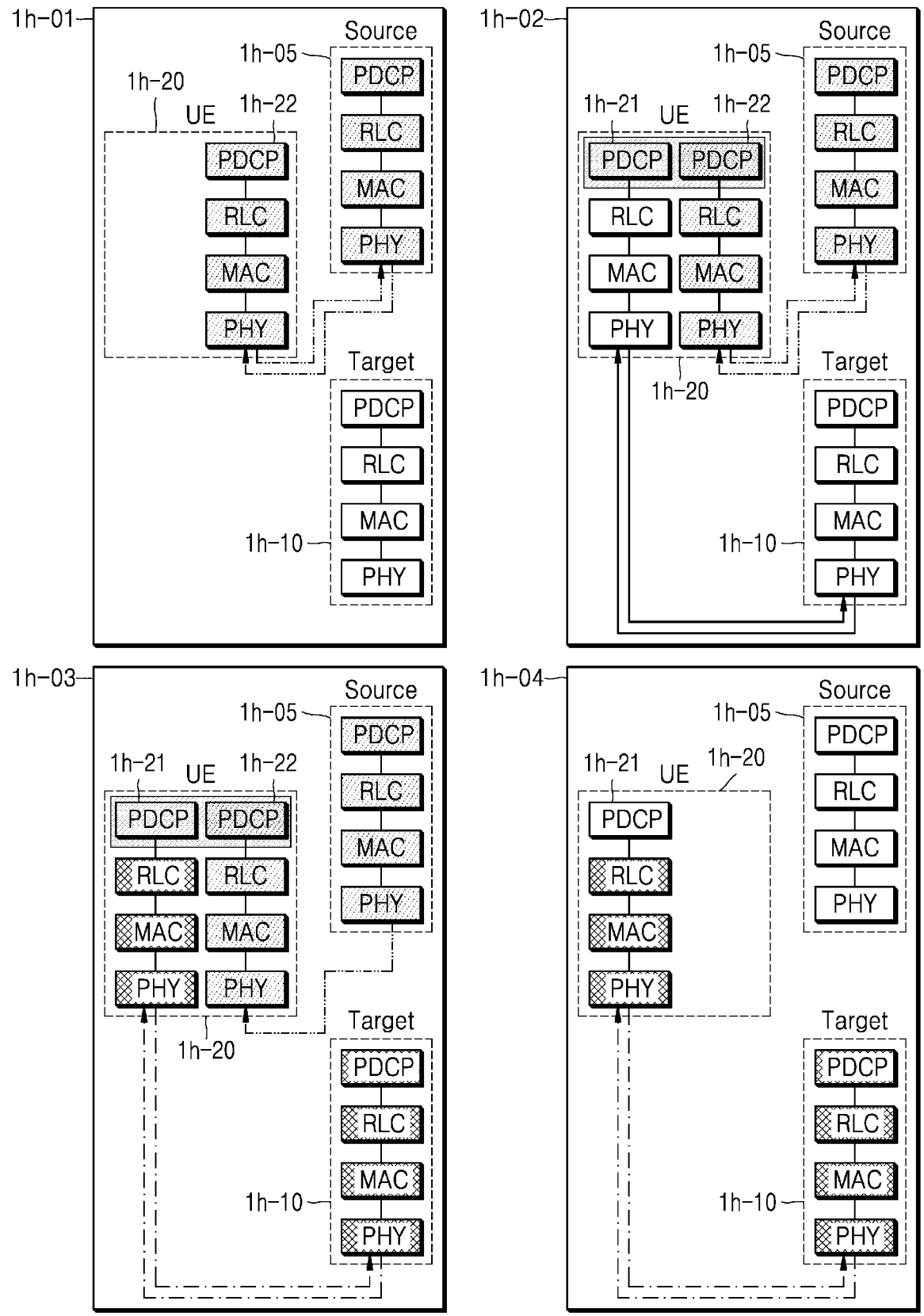
FIG. 1H illustrates particular operations of embodiment 2 of the efficient handover method for minimizing a data interruption time due to handover, according to an embodiment of the disclosure.

FIG. 1H illustrates particular operations of embodiment 2 of the efficient handover method for minimizing a data interruption time due to handover, according to an embodiment of the disclosure.

According to an embodiment of the disclosure, in embodiment 2 of the efficient handover method of FIG. 1H, in first operation 1h-01, a UE 1h-20 may receive a handover command message from a source BS 1h-05 when the UE 1h-20 transmits and/or receives data with the source BS 1h-05. When the source BS 1h-05 indicates, in the handover command message, a handover method (e.g., a DAPS handover method) according to embodiment 2 of the efficient handover method provided in the disclosure, or indicates the handover method for each bearer, even when the UE 1h-20 has received the handover command message, the UE 1h-20 may continuously transmit and receive data to and from the source BS 1h-05 via protocol layers 1h-22 of a first bearer so as to minimize a data interruption time occurring in handover.

Also, when an RRC layer of the UE 1h-20 identifies, in the handover command message, an indication with respect to the handover method (e.g., the DAPS handover method) according to embodiment 2 of the efficient handover method provided in the disclosure, or identifies an identifier with respect to the DAPS handover method for each bearer, the RRC layer may provide the indicator to each bearer or a PDCP layer of a bearer for which the DAPS handover method is indicated. When the PDCP layer receives the indicator, the PDCP layer may switch a first PDCP layer architecture 1i-11 or 1i-12 (see FIG. 1I) to a second PDCP layer architecture 1i-20 (see FIG. 1I).

First operation 1h-01 of FIG. 1H may be described as an operation in which the UE 1h-20 receives a handover command message (an RRCReconfiguration message) from a BS. When the UE 1h-20 transits to the second PDCP layer architecture 1i-20 according to configuration included in the received handover command message, the UE 1h-20 may pre-configure or pre-set up protocol layers (a PHY layer, a MAC layer, an RLC layer or a PDCP layer) 1h-21 of a second bearer for a target BS 1h-10, may derive and update a security key for the target BS 1h-10, and may configure header (or data) compression context for the target BS 1h-10. Also, the UE 1h-20 may receive the handover command message from the source BS 1h-05, and in the handover command message, when the source BS 1h-05 indicates the DAPS handover method provided in the disclosure, when the source BS 1h-05 indicates the DAPS handover method for particular bearers, or when a PDCP realignment timer value is newly configured, the UE 1h-20 may switch the first PDCP layer architecture or function 1i-11 or 1i-12 to the second PDCP layer architecture or function 1i-20 provided in the disclosure with respect to each bearer or a bearer for which the DAPS handover method is indicated. When the UE 1h-20 switches the first PDCP layer architecture or function 1i-11 or 1i-12 to the second PDCP layer architecture or function 1i-20 provided in the disclosure, the UE 1h-20 may update a variable for realignment to a PDCP SN or a COUNT value which is predicted to be received next time, may stop a realignment timer, and may restart a timer.

When the UE 1h-20 receives the handover command message (e.g., the RRCReconfiguration message), an RRC layer of the UE 1h-20 may start a first timer (e.g., T304). The first timer may be stopped when the UE 1h-20 performs a random access procedure on the target BS 1h-10 so as to perform handover and the random access procedure is successfully completed (e.g., when a first condition provided in the disclosure is satisfied). In a case where the handover fails and thus the first timer is expired, when connection to the source BS 1h-05 is active, the UE 1h-20 may fall back and report a handover failure of the UE to the source BS 1h-05 and may attempt connection recovery, and when connection to the source BS 1h-05 is inactive, the UE 1h-20 may perform an RRC connection re-establishment procedure.

The handover command message the UE 1h-20 receives from the source BS 1h-05 may include information by which a second bearer is configured to have a same identifier as a first bearer and then is established, such that a data interruption time does not occur in each bearer. In embodiment 2 of the disclosure, a PDCP layer of a first bearer and a PDCP layer of a second bearer may logically operate as one PDCP layer, and detailed descriptions about the operation will now be provided with reference to FIG. 1I.

In embodiment 2 of the disclosure, when a UE is configured to transmit UL data to both a source BS and a target BS, to avoid a coverage lessening problem due to insufficient transmission power of the UE or to prevent link selection by which, when the UE transmits UL data, the UE has to determine to which BS the UE has to request a transmit resource and to transmit the UL data, the UE in embodiment 2 of the disclosure may transmit the UL data to only one of the source BS and the target BS. In detail, in embodiment 2 of the disclosure, when the UE does not have a capability (dual uplink transmission) of simultaneously transmitting UL data to different BSs at different frequencies or a same frequency, the UE may transmit the UL data to only one BS from among the source BS and the target BS within one time unit. Therefore, the UE may perform a scheduling request to only one BS from among the source BS and the target BS, may transmit a report (e.g., a buffer status report) about a size of a plurality of items of data to be transmitted by the PDCP layer to only one BS from among the source BS and the target BS, may receive a UL transmit resource, and thus may transmit UL data to only one BS. Also, even when the UE receives a handover command message from the source BS, the UE may not initialize a MAC layer of a first bearer so as to prevent data loss by continuing data transmission and reception by retransmitting HARQ. Also, an RLC layer in an AM mode may continuously perform RCL retransmission.

As another method, when the handover command message indicates, for each bearer, embodiment 2 (the DAPS handover method) of the efficient handover method provided in the disclosure, the UE may continuously transmit or receive data to or from the source BS with respect to only a PDCP layer, an RLC layer, or a MAC layer, which corresponds to a bearer or a logical channel identifier for which embodiment 2 (the DAPS handover method) is indicated in the handover command message, or with respect to only data corresponding to the bearer or the logical channel identifier. Also, when the first condition provided in the disclosure is satisfied (e.g., when UL data transmission is switched to the target BS), the UE may continuously transmit or receive RLC control data (an RLC status report), PDCP control data (an ROHC feedback or a PDCP status report), or HARQ retransmission to or from the source BS with respect to only the PDCP layer, the RLC layer, or the MAC layer, which corresponds to the bearer or the logical channel identifier for which embodiment 2 (the DAPS handover method) is indicated in the handover command message. Also, when the handover command message indicates, for each bearer, embodiment 2 (the DAPS handover method) of the efficient handover method provided in the disclosure, the UE may discontinue transmission or reception of data to or from the source BS with respect to a PDCP layer, an RLC layer, or a MAC layer, which corresponds to a bearer or a logical channel identifier for which embodiment 2 (the DAPS handover method) is not indicated in the handover command message.

Also, in a case where the UE receives the handover command message and the handover command message indicates the DAPS handover method provided in the disclosure, when the DAPS handover method is indicated for particular bearers and a QoS flow and bearer mapping information are newly configured, the UE may switch a first SDAP layer architecture or function $1j$-10 (see FIG. 1J) to a second SDAP layer architecture or function $1j$-20 (see FIG. 1J) provided in the disclosure with respect to each bearer or a bearer for which the DAPS handover method is indicated. Also, in the second SDAP layer architecture, an existing first QoS flow and existing bearer mapping information for the source BS are maintained such that UL data to be transmitted to the source BS and DL data to be received from the source BS may be processed. A second QoS flow and the bearer mapping information that are newly configured in the handover command message are configured for the target BS and may be used to process UL data to be transmitted to the target BS S and DL data to be received from the target BS. That is, in the second SDAP layer architecture provided in the disclosure, the first QoS flow and the bearer mapping information for the source BS or the second QoS flow and the bearer mapping information for the target BS are maintained such that data for the source BS and data for the target BS may be separately processed. In the second SDAP layer architecture, an SDAP layer may identify whether data received from a lower layer is data received from the source BS or data received from the target BS, by using a 1-bit indicator of an SDAP header, a 1-bit indicator of a PDCP header, or information indicated by the PDCP layer. When the source BS indicates the DAPS handover method with respect to each bearer to the UE by using the handover command message, the DAPS handover method is always indicated with respect to a default DRB, and when data occurs in a new QoS flow that does not correspond to a QoS flow and bearer mapping information when a DAPS handover procedure is performed, the UE may be indicated to always transmit UL data via the default bearer. When the DAPS handover method is not configured for the default bearer, UL data transmission with respect to a new QoS flow occurred in handover is impossible such that a data interruption time may occur.

As another method, when the UE receives a handover command message (an RRCReconfiguration message) in which embodiment 2 (the DAPS handover method) is indicated, and SDAP layer configuration information or a second QoS flow and bearer mapping information for the target BS are configured in the RRC message, the UE may apply the SDAP layer configuration information or the second QoS flow and the bearer mapping information when the first condition provided in the disclosure is satisfied. Also, when embodiment 2 (the DAPS handover method) is indicated for each bearer in the handover command message, the UE may maintain and apply only a first QoS flow and bearer mapping information which correspond to a bearer for which embodiment 2 is indicated from among a first QoS flow and bearer mapping information for the source BS, and may release or does not apply a first QoS flow and bearer mapping information which correspond to a bearer for which embodiment 2 is not indicated. Also, when the SDAP layer configuration information or the second QoS flow and the bearer mapping information for the target BS are configured in the RRC message, the UE may apply the SDAP layer configuration information or the second QoS flow and the bearer mapping information to data transmission or reception to or from the target BS when the first condition provided in the disclosure is satisfied.

According to an embodiment of the disclosure, in embodiment 2 of the efficient handover method of FIG. 1H, in second operation $1h$-02, the UE $1h$-20 may perform a random access procedure on the target BS $1h$-10 via the protocol layers of the second bearer, the target BS $1h$-10 being indicated in the handover command message. When performing the random access procedure via the protocol layers of the second bearer, the UE $1h$-20 may continue data transmission or reception (UL data transmission or DL data reception) to or from the source BS $1h$-05 via the protocol layers of the first bearer. Second operation $1h$-02 may be described as an operation in which the UE $1h$-20 performs a cell selection procedure or a cell reselection procedure, and performs a random access procedure on a target cell indicated by a handover command message (an RRCReconfiguration message) received from the source BS $1h$-05.

According to an embodiment of the disclosure, in embodiment 2 of the efficient handover method of FIG. 1H, when the first condition to be described below is satisfied in third operation $1h$-03, the UE $1h$-20 may discontinue UL data transmission to the source BS $1h$-05 via the protocol layers $1h$-22 of the first bearer and may transmit the UL data to the target BS $1h$-10 via the protocol layers $1h$-21 of the second bearer. In this regard, the UE $1h$-20 may continuously receive DL data from the source BS $1h$-05 and the target BS $1h$-10 via the protocol layers of the first and second bearers. Third operation $1h$-03 may be an operation in which the UE $1h$-20 satisfies the first condition and thus switches UL transmission from the source BS $1h$-05 to the target BS $1h$-10. In detail, in the operation, the UE $1h$-20 transmits UL data to the source BS $1h$-05 via the first bearer until the UE $1h$-20 satisfies the first condition, and when the UE $1h$-20 satisfies the first condition, the UE $1h$-20 discontinues transmission of the UL data to the source BS $1h$-05 via the first bearer, and starts transmission of the UL data to the target BS $1h$-10 via the second bearer.

In detail, in the second PDCP layer architecture provided in the disclosure, in a case where the PDCP layer transmits UL data via the first bearer and satisfies the first condition and thus receives an indicator from a lower layer (when the MAC layer succeeds in a random access procedure on a target BS) or an upper layer (when a first timer is expired in the RRC layer), the PDCP layer may discontinue transmission of the UL data via the first bearer, may perform switching, and may start transmission of the UL data via the second bearer. Also, as in the PDCP layer structure provided with reference to FIG. 1I, a reception PDCP layer $1h$-21 of the second bearer and a reception PDCP layer $1h$-22 of the first bearer may operate as one entity, and the reception PDCP layer $1h$-21 may continuously receive data from the source BS $1h$-05 or the target BS $1h$-10 without interruption by using stored transmitted and/or received data, SN information, or information such as header compression and decompression context. The first condition may be one of conditions below. The first conditions below propose a UL data transmission switching time point at which a transmit resource may be maximally and efficiently used, and a data interruption time may be minimized.

It may be determined that the first condition is satisfied in a case where the UE successfully completes a random access procedure on the target BS via the layers (e.g., a MAC layer) of the second bearer, a case where the UE successfully completes the random access procedure on the target BS via the layers (e.g., the MAC layer) of the second bearer and receives allocation of a first UL transmit resource from the target B S, or a case where a UL transmit resource is first indicated to the UE.

For example, in a case where the UE receives a handover command message from the source BS and receives an indication of a random access to the target BS, when the indicated random access is a contention free random access (CFRA) (e.g., when a predefined preamble or a UE-cell identifier (e.g., cell-radio network temporary identifier (C-RNTI) is allocated), it may be determined that the random access procedure is successfully completed when the UE transmits the predefined preamble to a cell of the target BS and receives an RAR message. Therefore, when the UE receives (is allocated) a first UL transmit resource allocated (or included or indicated) in the RAR message, it may be determined that the first condition is satisfied. As another method, when the UE first receives a UL transmit resource after the UE receives the RAR message, it may be determined that the first condition is satisfied.

In a case where the UE receives a handover command message from the source BS and receives an indication of a random access to the target BS, when the indicated random access is a contention-based random access (CBRA) (e.g., when a predefined preamble or a UE-cell identifier (e.g., C-RNTI) is not allocated), it may be determined that the random access procedure on the target BS is successfully completed when the UE transmits a preamble (e.g., a random preamble) to a cell of the target BS and receives an RAR message, transmits a message3 (e.g., a handover complete message) to the target BS by using a UL transmit resource allocated (or included or indicated) in the RAR message, and receives, from the target BS and via a message4, a Contention resolution MAC CE indicating resolution of contention or receives a UL transmit resource via a PDCCH corresponding to a C-RNTI of the UE. Therefore, when the UE monitors the PDCCH and first receives (or is first indicated with) the UL transmit resource via the PDCCH corresponding to the C-RNTI of the UE, it may be determined that the first condition is satisfied. As another method, when a size of the UL transmit resource allocated in the RAR message is sufficient and thus the UE can transmit the message3 and additionally transmit UL data, the UE may determine that the UE first receives a UL transmit resource and thus may determine that the first condition is satisfied. That is, when the UE receives an RAR message, the UE may determine that the UE first receives the UL transmit resource and thus may determine that the first condition is satisfied.

When a handover method (RACH-less handover) that does not request a random access procedure is also indicated in the handover command message received by the UE, it may be determined that the first condition is satisfied in cases below.

When the handover command message includes a UL transmit resource with respect to the target BS, the UE transmits a message3 (e.g., a handover complete message or a RRCReconfigurationComplete message) by using the UL transmit resource with respect to the target BS, and when the UE receives, from the BS, a UE identity confirmation MAC CE via a message4, or receives a UL transmit resource via a PDCCH corresponding to a C-RNTI of the UE, it may be determined that a random access procedure is successfully completed and the first condition is satisfied. As another method, after the random access procedure is successfully completed, the UE performs PDCCH monitoring and receives a first UL transmit resource via the PDCCH corresponding to the C-RNTI of the UE, it may be determined that the first condition is satisfied.

When the handover command message does not include the UL transmit resource with respect to the target BS, the UE performs PDCCH monitoring on the target BS (or a cell) and when the UE receives a UL transmit resource via the PDCCH corresponding to the C-RNTI of the UE, or transmits a message3 (e.g., a handover complete message or a RRCReconfigurationComplete message) by using the UL transmit resource, and receives a UE identity confirmation MAC CE from the BS or receives a UL transmit resource via the PDCCH corresponding to the C-RNTI of the UE, it may be determined that a random access procedure is successfully completed and the first condition is satisfied. As another method, after the random access procedure is successfully completed, the UE performs PDCCH monitoring and receives a first UL transmit resource via the PDCCH corresponding to the C-RNTI of the UE, it may be determined that the first condition is satisfied.

Hereinafter, provided is a method of efficiently switching UL data from a source BS to a target BS, the method being performed when the DAPS handover method provided in the disclosure is performed. A MAC layer or an RRC layer of a second bearer for the target BS may check or identify whether the first condition is satisfied, by using one or a combination of methods to be described below.

First method: For example, when an RRCReconfiguration message received by the UE indicates DAPS handover, the UE may configure the MAC layer of the second bearer for the target BS and the MAC layer for the target BS may perform a random access procedure and may identify whether the first condition is satisfied. When the first condition is satisfied, the MAC layer for the target BS may indicate, by using an indicator, an upper layer (e.g., a PDCP layer) to switch UL data transmission from the source BS via a first bearer to the target BS via the second bearer in the DAPS handover method provided in the disclosure.

Second method: As another method, for example, when an RRCReconfiguration message received by the UE indicates DAPS handover, the UE may configure the MAC layer of the second bearer for the target BS and the MAC layer for the target BS may perform a random access procedure and may identify whether the first condition is satisfied. When the first condition is satisfied, the MAC layer for the target BS may indicate, to an upper layer (e.g., an RRC layer), that the first condition is satisfied. Also, the upper layer (e.g., the RRC layer) may indicate, by using an indicator, a lower layer (e.g., the PDCP layer) to switch UL data transmission from the source BS via the first bearer to the target BS via the second bearer in the DAPS handover method provided in the disclosure. When the first condition provided in the disclosure is satisfied or a random access procedure on the target BS is successfully performed, the upper layer (e.g., the RRC layer) may stop a first timer, and when the first timer is stopped, the RRC layer may indicate, by using an indicator, the PDCP layer to perform switching.

Third method: When an RRCReconfiguration message received by the UE indicates DAPS handover, the UE may configure the MAC layer of the second bearer for the target BS, and when the RRC layer of the UE indicates, by using an indicator, a lower layer (e.g., the MAC layer) to perform the DAPS handover, the MAC layer for the target BS may perform a random access procedure and may check whether the first condition is satisfied. When the first condition is satisfied, the MAC layer for the target BS may indicate, by using an indicator, an upper layer (e.g., the PDCP layer) to switch UL data transmission from the source BS via the first bearer to the target BS via the second bearer in the DAPS handover method provided in the disclosure.

Fourth method: As another method, when an RRCReconfiguration message received by the UE indicates DAPS handover, the UE may configure the MAC layer of the second bearer for the target BS, and when the RRC layer of the UE indicates, by using an indicator, a lower layer (e.g., the MAC layer) to perform the DAPS handover, the MAC layer for the target BS may perform a random access procedure and may check whether the first condition is satisfied. When the first condition is satisfied, the MAC layer may indicate, to an upper layer (e.g., the RRC layer), that the first condition is satisfied. In a case where the indicator is identified, the upper layer (e.g., the RRC layer) may stop the first timer when the first condition provided in the disclosure is satisfied or the random access procedure on the target BS is successfully performed. Also, the upper layer (e.g., the RRC layer) may indicate, by using an indicator, a lower layer (e.g., the PDCP layer) to switch UL data transmission from the source BS via the first bearer to the target BS via the second bearer in the DAPS handover method provided in the disclosure.

When the PDCP layer receives (e.g., when the DAPS handover method is indicated) an indicator indicating that the first condition is satisfied or an indicator indicating switching UL data transmission from the source BS to the target BS, from the upper layer (e.g., the RRC layer) or the lower layer (e.g., the MAC layer) according to the first method, the second method, the third method, or the fourth method, the PDCP layer may perform a protocol layer operation provided below so as to efficiently perform switching of UL data transmission, and may perform one or more operations from among operations below so as to prevent data loss due to the UL data transmission.

The operations below may be applied to the PDCP layer connected to an AM DRB or an UM DRB (an RLC layer operating in an AM mode or an RLC layer operating in an UM mode). Before the first condition is satisfied or before the indicator indicating that the first condition is satisfied is received, the PDCP layer may indicate, to the MAC layer of the first bearer for the source BS, that there is data to be transmitted by indicating a size or amount (e.g., a PDCP data volume) of the data to be transmitted when a buffer stores the data to be transmitted, and may perform UL data transmission to the source BS. Then, the MAC layer of the first bearer for the source BS may perform a scheduling request or a buffer status report procedure to receive allocation of a UL transmit resource from the source BS. When the first condition is satisfied or the indicator indicating that the first condition is satisfied is received, UL data transmission may be switched to the target BS in a manner described below.

To switch UL data transmission from the first bearer for the source BS to the second bearer for the target BS, the PDCP layer may indicate, to the MAC layer of the first bearer for the source BS, that a size or amount of data to be transmitted is 0 (or none). That is, the PDCP layer may indicate, to the MAC layer of the first bearer, that a data volume (a PDCP data volume) of the PDCP layer is 0, thereby indicating that there is no more data to be transmitted (even when the buffer actually stores a plurality of items of data to be transmitted, in order to switch UL data transmission, the PDCP layer may indicate, to the MAC layer of the first bearer for the source BS, that there is no more data to be transmitted). However, in a case where the handover method (the DAPS handover method) of embodiment 2 as provided in the disclosure is indicated, when RLC control data (an RLC status report) or PDCP control data (a PDCP status report or an ROHC feedback) is generated, the UE may indicate a data volume corresponding to the RLC control data or the PDCP control data to the MAC layer and may perform data transmission to the source BS.

The PDCP layer connected to an AM DRB (that is an RLC layer operating in an AM mode) (all pre-stored PDCP PDUs are discarded (e.g., PDCP SDUs are not discarded to prevent loss of original data)) may perform, based on header context for the target BS, a new header compression procedure on a plurality of items of data (the PDCP SDUs of the buffer) in ascending order of COUNT values (or PDCP SNs) allocated before the first condition is satisfied or the indicator indicating that the first condition is satisfied is received, the ascending order starting from first data (e.g., a PDCP SDU) for which successful delivery is not acknowledged by lower layers (e.g., the RLC layer of the first bearer for the source BS). The PDCP layer may re-perform, by applying security keys for the target BS, an integrity related procedure or a ciphering procedure on the plurality of items of data on which new header compression procedure has been performed, may configure a PDCP header, and may provide the PDCP header to a lower layer (the RLC layer of the second bearer for the target BS), thereby performing retransmission or transmission.

That is, the PDCP layer may perform accumulated retransmission on data starting from first data for which successful delivery is not acknowledged. As another method, when the PDCP layer performs retransmission, the PDCP layer may perform retransmission only on a plurality of items of data for which successful delivery is not acknowledged by lower layers (e.g., the RLC layers of the first bearer for the source BS). In detail, the PDCP layer connected to the AM DRB (or the RLC layer operating in the AM mode) (PDCP PDUs that are stored to be transmitted to the source BS via a first protocol layer previously connected to the PDCP layer are all discarded (e.g., PDCP SDUs may not be discarded to prevent loss of original data)) may perform, by applying header compression (or data compression) protocol context or security key corresponding to the target BS, a new header or data compression procedure on a plurality of items of data (e.g., the PDCP SDUs) for which successful delivery is not acknowledged by lower layers (e.g., the RLC layers) that are the first protocol layer for the source BS, based on COUNT values (or PDCP SNs) allocated before the first condition is satisfied or the indicator indicating that the first condition is satisfied is received. The PDCP layer may re-perform an integrity related procedure or a ciphering procedure on the plurality of items of data on which new header or data compression procedure has been performed, may configure a PDCP header, and may provide the PDCP header to a lower layer that is a second protocol layer for transmission to the target BS, thereby performing retransmission or transmission. That is, to prevent waste of transmit resources, the PDCP layer may perform selective retransmission only on the plurality of items of data for which successful delivery is not acknowledged. As another method, the transmission or the retransmission may be performed after lower layers (e.g., transmission or reception RLC layer or MAC layer) that are the first protocol layer for transmitting data to the source BS are released.

When the transmission or retransmission procedure is extended to a UM DRB, the PDCP layer connected to an RLC layer operating in a UM mode may regard data that is not transmitted to a lower layer yet, data for which PDCP discard timer is not expired, or a plurality of items of data to which PDCP SNs (or COUNT values) are already allocated, as data received or newly received from an upper layer. Also, the PDCP layer may not restart a PDCP discard timer with respect to data regarded as the data received or newly received from the upper layer, may perform header (or data) compression, ciphering, or an integrity protection procedure on the plurality of items of data by using header (or data) compression context or a security key for the target BS, may generate and combine a PDCP header, and then may perform transmission or retransmission. Also, the PDCP layer may process data in ascending order of COUNT values allocated before the procedure is triggered and may perform transmission or retransmission. A window state variable of the PDCP layer connected to the UM DRB or the AM DRB may not be initialized and may be maintained.

When the buffer stores data to be transmitted, the PDCP layer may indicate, to the MAC layer of the second bearer for the target BS, that there is the data to be transmitted by indicating a size or amount (e.g., a PDCP data volume) of the data to be transmitted, and may perform switching of UL data transmission to the target BS. Then, the MAC layer of the second bearer for the target BS may perform a scheduling request or a buffer status report procedure to receive allocation of a UL transmit resource from the target BS.

According to embodiment 2 of the efficient handover method (e.g., the DAPS handover method) provided in the disclosure, even after the UE receives a handover command message (e.g., an RRCReconfiguration message), the UE may continuously receive DL data from the source BS or the target BS via the protocol layers of the first bearer for the source BS or the second bearer for the target BS. Also, according to embodiment 2 of the disclosure, to allow the UE to smoothly receive DL data from the source BS (or the target BS) or to allow the source BS (or the target BS) to smoothly transmit DL data to the UE, for AM bearers, the UE may be allowed to continuously perform UL transmission of an RLC status report, not data, on the source BS (or the target BS) via the protocol layers of the first bearer (or the second bearer). That is, even when the first condition is satisfied and thus the UE switches UL data transmission to the target BS, when the UE has to transmit the RLC status report, HARQ ACK or NACK, or PDCP control data (a PDCP ROHC feedback or a PDCP status report) to the source BS, the UE may be allowed to perform data transmission via the first bearer for the source BS. In a case of the AM bearers, when data is transmitted to a transmitting end and then successful delivery is not indicated by using an RLC status report (i.e., when the RLC status report is not received), data cannot be continuously transmitted thereafter.

In detail, when the first condition is satisfied in third operation 1h-03 in embodiment 2 of the efficient handover method of FIG. 1H, the UE 1h-20 discontinues UL data transmission to the source BS 1h-05 via the protocol layers 1h-22 of the first bearer, performs switching, and then starts UL data transmission to the target BS 1h-10 via the protocol layers 1h-21 of the second bearer, the UE 1h-20 may continuously transmit HARQ ACK or HARQ NACK information, an RLC status report (ACK or NACK information), or PDCP control data (e.g., a PDCP status report or PDCP ROHC feedback information) via the protocol layers of the first bearer (or the second bearer) so as to smoothly receive DL data from the source BS 1h-05 (or the target BS 1h-10) or to allow the source BS 1h-05 (or the target BS 1h-10) to smoothly transmit DL data.

In detail, in third operation 1h-03 in embodiment 2 of the efficient handover method of FIG. 1H, even when the first condition is satisfied and thus the UE 1h-20 discontinues UL data transmission to the source BS 1h-05 via the protocol layers 1h-22 of the first bearer, performs switching, and then starts UL data transmission to the target BS 1h-10 via the protocol layers 1h-21 of the second bearer, the UE 1h-20 may continuously perform data transmission due to HARQ retransmission by the MAC layer or data transmission due to retransmission by the RLC layer in the AM mode so as to prevent loss of data to the source BS 1h-05.

In detail, in third operation 1h-03 in embodiment 2 of the efficient handover method of FIG. 1H, when the first condition is satisfied and thus the UE 1h-20 discontinues UL data transmission to the source BS 1h-05 via the protocol layers 1h-22 of the first bearer, performs switching, and then starts UL data transmission to the target BS 1h-10 via the protocol layers 1h-21 of the second bearer, the source BS 1h-05 or the target BS 1h-10 may divide a time and may allocate a transmit resource to the UE 1h-20 so as to prevent collision between a UL transmit resource to the target BS 1h-10 and a UL transmit resource to the source BS 1h-05. When the UL transmit resource to the target BS 1h-10 collides with and thus overlaps with the UL transmit resource to the source BS 1h-05, the UE 1h-20 may perform data transmission to the source BS 1h-05 by giving priority to the UL transmit resource to the source BS 1h-05 so as to maintain transmission of DL data or continuously receive the DL data from the source BS 1h-05 without a problem.

As another method, when a UL transmit resource to a target BS collides with and thus overlaps with a UL transmit resource to a source BS, a UE may perform data transmission to the target BS by giving priority to the UL transmit resource to the target BS so as to maintain transmission of DL data from the target BS.

In detail, when the UE receives a handover command message in which handover (the DAPS handover method) corresponding to embodiment 2 of the disclosure is indicated or is indicated for each bearer, the UE or a bearer for which the DAPS handover is indicated may perform a scheduling request via a first protocol layer, may receive a UL transmit resource by transmitting a buffer status report to the source BS, may transmit UL data, and may receive DL data from the source BS until the first condition is satisfied. However, when the first condition is satisfied, the UE does not transmit data to the source BS anymore, may perform a scheduling request via a second protocol layer by switching a UL, may receive a UL transmit resource by transmitting a buffer status report to the target BS, and may transmit UL data to the target B S. However, the UE may continuously receive DL data from the source BS, and, even after UL transmission switching, the UE may continuously transmit HARQ ACK or HARQ NACK, an RLC status report, or PDCP control data (e.g., a PDCP status report or ROHC feedback information) which corresponds to the DL data. Also, the UE may continuously receive DL data from the source BS or the target BS even when the first condition is satisfied.

When a second condition is satisfied in fourth operation 1h-04 in embodiment 2 of the efficient handover method of FIG. 1H, the UE 1h-20 may discontinue DL data reception from the source BS 1h-05 via the protocol layers 1h-22 of the first bearer or may release connection to the source BS 1h-05. The second condition may be one of conditions below. Also, the PDCP layer 1h-21 of the second bearer may continuously perform data transmission or reception without interruption to or from the target BS by using data to be transmitted or data to be received, SN information, or header compression and decompression context, which is stored in the PDCP layer 1h-22 of the first bearer.

When the UE 1h-20 performs a random access procedure on the target BS via layers 1h-21 of the second bearer and receives an RAR message, it may be determined that the second condition is satisfied.

When the UE 1h-20 performs a random access procedure on the target BS via the layers 1h-21 of the second bearer, receives an RAR message, and configures and transmits a handover complete message to the target BS, it may be determined that the second condition is satisfied.

When the UE 1h-20 performs a random access procedure on the target BS via the layers 1h-21 of the second bearer, and first transmits data by using a PUCCH or a PUCCH UL transmit resource or first receives the PUCCH or the PUCCH UL transmit resource, it may be determined that the second condition is satisfied.

When a BS configures a separate timer to a UE by using an RRC message, and the separate timer is expired, it may be determined that the second condition is satisfied. The separate timer may start when the UE receives a handover command message from a source BS, the UE starts a random access to a target BS (transmits a preamble), the UE receives an RAR message from the target BS, the UE transmits a handover complete message to the target BS, or the UE first transmits data by using a PUCCH or a PUCCH UL transmit resource.

When the UE performs a random access procedure on the target BS via protocol layers of a second bearer, receives an RAR message, configures and transmits a handover complete message to the target BS, and then receives acknowledgement with respect to successful delivery of the handover complete message via a MAC layer (HARQ ACK) or an RLC layer (RLC ACK), it may be determined that the second condition is satisfied.

When the UE performs a random access procedure on the target BS via the protocol layers of the second bearer, receives an RAR message or configures and transmits a handover complete message to the target BS and then first receives allocation of a UL transmit resource from the target BS or first receives an indication of the UL transmit resource, it may be determined that the second condition is satisfied.

When the source BS performs efficient handover provided in the disclosure, the source BS may determine when to discontinue transmission of DL data to the UE or when to release connection to the UE. For example, when a certain timer is expired (the timer can start after handover is indicated) or the source BS receives, from the target BS, an indication indicating that the UE has successfully performed handover to the target B S, the source BS may determine whether to discontinue transmission of DL data or when to release connection to the UE. When the UE does not receive DL data from the source BS for a certain time period, the UE may determine that the second condition is satisfied, and may determine that connection to the source BS is released and thus may release the connection.

When the UE receives, from the target BS, an indication (e.g., an RRC message (e.g., an RRCReconfiguration message)) indicating a release of connection to the source BS, or receives, from the target BS, a MAC CE, an RLC control PDU, or a PDCP control PDU, the UE may determine that the second condition is satisfied.

When the UE receives, from the source BS, an indication (e.g., an RRC message (e.g., an RRCReconfiguration message)) indicating a release of connection to the source BS, or receives, from the target BS, a MAC CE, an RLC control PDU, or a PDCP control PDU, the UE may determine that the second condition is satisfied.

When the UE does not receive DL data from the source BS for a certain time period, the UE may determine that the second condition is satisfied.

When the UE successfully completes a random access procedure on the target BS via the layers (e.g., the MAC layer) of the second bearer, the UE successfully completes the random access procedure on the target BS via the layers of the second bearer and then receives allocation of a first UL transmit resource from the target BS, or the UE first receives an indication of a UL transmit resource, it may be determined that the second condition is satisfied.

For example, in a case where the UE receives a handover command message from the source BS and receives an indication of a random access to the target BS, when the indicated random access is a CFRA (e.g., when a predefined preamble or a UE-cell identifier (e.g., C-RNTI is allocated), it may be determined that the random access procedure is successfully completed when the UE transmits the predefined preamble to a cell of the target BS and receives an RAR message. Therefore, when the UE receives a first UL transmit resource that is allocated, included or indicated in the RAR message, it may be determined that the first condition is satisfied. As another method, when the UE first receives a UL transmit resource after the UE receives the RAR message, it may be determined that the second condition is satisfied.

In a case where the UE receives a handover command message from the source BS and receives an indication of a random access to the target BS, when the indicated random access is a CBRA (e.g., when a predefined preamble or a UE-cell identifier (e.g., C-RNTI) is not allocated), it may be determined that the random access procedure on the target BS is successfully completed when the UE transmits a preamble (e.g., a random preamble) to a cell of the target BS and receives an RAR message, transmits a message3 (e.g., a handover complete message) to the target BS by using a UL transmit resource allocated (or included or indicated) in the RAR message, and receives, from the target BS and via a message4, a Contention resolution MAC CE indicating resolution of contention or receives a UL transmit resource via a PDCCH corresponding to a C-RNTI of the UE. Therefore, when the UE monitors the PDCCH and first receives or is first indicated with the UL transmit resource via the PDCCH corresponding to the C-RNTI of the UE, it may be determined that the second condition is satisfied.

As another method, when a size of the UL transmit resource allocated in the RAR message is sufficient and thus the UE can transmit the message3 and additionally transmit UL data, the UE may determine that the UE first receives a UL transmit resource and thus may determine that the second condition is satisfied. That is, when the UE receives an RAR message, the UE may determine that the UE first receives the UL transmit resource and thus may determine that the second condition is satisfied.

When a handover method (RACH-less handover) that does not request a random access procedure is also indicated in the handover command message received by the UE, it may be determined that the second condition is satisfied in cases below.

When the handover command message includes a UL transmit resource with respect to the target BS, the UE transmits a message3 (e.g., a handover complete message or a RRCReconfigurationComplete message) by using the UL transmit resource with respect to the target BS, and when the UE receives, from the BS, a UE identity confirmation MAC CE via a message4, or receives a UL transmit resource via a PDCCH corresponding to a C-RNTI of the UE, it may be determined that a random access procedure is successfully completed and the second condition is satisfied. As another method, after the random access procedure is successfully completed, the UE performs PDCCH monitoring and receives a first UL transmit resource via the PDCCH corresponding to the C-RNTI of the UE, it may be determined that the second condition is satisfied.

When the handover command message does not include the UL transmit resource with respect to the target BS, the UE performs PDCCH monitoring on the target BS (or a cell) and when the UE receives a UL transmit resource via the PDCCH corresponding to the C-RNTI of the UE, or transmits a message3 (e.g., a handover complete message or a RRCReconfigurationComplete message) by using the UL transmit resource, and receives a UE identity confirmation MAC CE from the BS or receives a UL transmit resource via the PDCCH corresponding to the C-RNTI of the UE, it may be determined that a random access procedure is successfully completed and the second condition is satisfied. As another method, after the random access procedure is successfully completed, the UE performs PDCCH monitoring and receives a first UL transmit resource via the PDCCH corresponding to the C-RNTI of the UE, it may be determined that the second condition is satisfied.

In a case where the UE performs embodiment 2 of the efficient handover method (e.g., the DAPS handover method) provided in the disclosure, when it is identified that the RRC layer, the MAC layer, and the RLC layer of the first bearer of the UE for the source BS, and the RRC layer, the MAC layer, and the RLC layer of the second bearer of the UE for the target BS satisfy the second condition provided in the disclosure, an indicator indicating that the second condition is satisfied may be indicated to a PDCP layer of the UE or a bearer which performs the DAPS handover method. When the PDCP layer of the UE receives, from a lower layer or an upper layer, the indicator indicating that the second condition is satisfied, the UE may perform one or more procedures below, thereby performing operations of embodiment 2 of the efficient handover method provided in the disclosure.

The UE may release the first bearer for the source BS and may release connection to the source BS. Then, before the UE releases the first bearer for the source BS, the UE may perform an RLC re-establishment procedure on the RLC layer corresponding to the first bearer for the source BS. For example, when a realignment timer is running, the UE may stop or reset the timer, and when received data is stored in a buffer, the UE may process and provide the stored data to the upper layer. When data to be transmitted is present in the buffer, the UE may discard the data or may initialize the MAC layer.

When the UE releases connection to the source BS, in order to report, to the target BS, a reception status of a plurality of items of DL data received from the source BS, the UE may trigger a PDCP status report procedure, may configure a PDCP status report, and may transmit the PDCP status report to the target BS.

When the second condition is satisfied, the UE may switch a second PDCP layer architecture or function 1*i*-20 (see FIG. 1I) to a first PDCP layer architecture or function 1*i*-11 or 1*i*-12 (see FIG. 1I) provided in the disclosure with respect to each bearer or a bearer for which the DAPS handover method is indicated. The UE may initialize a variable for realignment, may stop and reset the realignment timer, may perform a deciphering procedure or header (or data) decompression by applying a security key or header decompression context for the source BS to a plurality of items of data (e.g., a plurality of items of data received from the source BS) stored for reordering in the buffer, and may discard the security key or the header decompression context for the source BS. The UE may provide the plurality of items of processed data to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS.

As another method, when the second condition is satisfied, the UE may switch the second PDCP layer architecture or function 1*i*-20 to a third PDCP layer architecture or function 1*i*-30 (see FIG. 1I) provided in the disclosure with respect to each bearer or a bearer for which the DAPS handover method is indicated. Also, the UE may not stop nor initialize but may continuously use the variable for realignment and the realignment timer. However, the UE may perform the deciphering procedure or header (or data) decompression by applying the security key or header decompression context for the source BS to the plurality of items of data (e.g., the plurality of items of data received from the source B S) stored for reordering in the buffer, and may discard the security key or the header decompression context for the source BS. Also, the UE may provide the plurality of items of processed data to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. The UE may release QoS mapping information of the SDAP layer, security key information of the PDCP layer for the source BS, header (or data) compression context information for the source BS, or the RLC layer or the MAC layer for the source BS.

When the second condition provided in the disclosure is satisfied when the UE performs the DAPS handover method, the UE may release the second SDAP layer architecture and function 1*j*-20 with respect to first bearers for the source BS, the second SDAP layer architecture and function 1*j*-20 having been applied to each bearer or a bearer for which the DAPS handover method is indicated, and may switch the second SDAP layer architecture and function 1*j*-20 to the first SDAP layer architecture or function 1*j*-10 and apply the first SDAP layer architecture or function 1*j*-10. Also, when the second condition is satisfied, the UE may switch the second SDAP layer architecture and function 1*j*-20 to the first SDAP layer architecture or function 1*j*-10 provided in the disclosure with respect to each bearer or a bearer for which the DAPS handover method is indicated. Here, the second bearer or the second QoS flow and the bearer mapping information for the target BS may be maintained. Also, before the UE releases the first bearer or the first QoS flow and the bearer mapping information for the source BS, the UE may complete data processing by applying the first QoS flow and the bearer mapping information to a plurality of items of data received from the source BS (e.g., all data received from the source BS), and then may release the first QoS flow and the bearer mapping information or the first bearer. Also, the UE may provide the plurality of items of processed data to the upper layer in ascending order.

That is, when the second condition is satisfied, the UE may process data by applying the first QoS flow and the bearer mapping information for the source BS to a plurality of items of data stored in the buffer (e.g., a plurality of items of data received from the source BS). For example, the UE may perform a procedure of reading SDAP header information and updating mapping information or configuring an SDAP header, or routing or providing the processed information to an upper layer or a lower layer which is appropriate based on the first QoS flow and the bearer mapping information. Afterward, the UE may discard the first QoS flow and the bearer mapping information for the source BS.

The SDAP layer may define and apply information indicated by a 1-bit indicator of a new SDAP header, a 1-bit indicator of a new PDCP header, SDAP control data (e.g., DL End marker), or the PDCP layer, and may identify which data is most recently received data (or last data received) from the source BS, based on the information. Therefore, the SDAP layer may perform data processing on the data by applying the first QoS flow and the bearer mapping information for the source BS, the data being most recently received from the source BS, and then may discard the first QoS flow and the bearer mapping information for the source BS. Also, the SDAP layer may continuously maintain the second QoS flow and the bearer mapping information, and may process UL data or DL data with respect to the target BS, based on the second QoS flow and the bearer mapping information.

When the source gNB 1*f*-02 in FIG. 1F of the disclosure transmits the handover command message to the UE 1*f*-01 (operation 1*f*-20), the source gNB 1*f*-02 may define indicators related to embodiments of the disclosure in the handover command message (e.g., an RRCReconfiguration message), and may indicate, to the UE 1*f*-01, which handover procedure corresponding to which embodiment is to be triggered. The UE 1*f*-01 may perform a handover procedure according to a handover method indicated in the handover command message. For example, the UE 1*f*-01 may perform handover to the target gNB 1*f*-03 in a manner that the UE 1*f*-01 minimizes a data interruption time by performing embodiment 2 (the DAPS handover method) of the efficient handover method provided in the disclosure.

As another method, the source gNB 1*f*-02 may define indicators for respective bearers, the indicators being related to embodiments of the disclosure, in the handover command message, and may further particularly indicate which embodiment is to be applied to which bearer in handover. For example, the source gNB 1*f*-02 may indicate, via the handover command message, to apply embodiment 2 of the disclosure only to the AM bearer in which the RLC layer operating in the AM mode is active, or may extensively apply embodiment 2 to the UM bearer in which the RLC layer operating in the UM mode is active.

It is assumed that embodiments of the disclosure are applied to a DRB. However, when required (e.g., in a case where the UE fails to perform handover while the UE maintains an SRB with respect to the source BS, and thus the UE can report a handover failure message via the SRB with respect to the source BS or can recover), embodiments of the disclosure may be applied to the SRB.

In embodiments of the disclosure, when the UE performs data transmission and reception to and from the source BS via the protocol layers of the first bearer and performs data transmission and reception to and from the target BS via the protocol layers of the second bearer, the MAC layer of the first bearer and the MAC layer of the second bearer may each operate a discontinuous reception (DRX) period, thereby reducing battery consumption in the UE. That is, even after the UE receives the handover command message, the UE may continuously apply the DRX period of the MAC layer that was applied when transmitting and receiving data via the protocol layers of the first bearer, and may discontinue the DRX period according to the first condition or the second condition. Also, the UE may manage, in response to indication from the target BS, whether to separately apply the DRX period to the MAC layer of the second bearer.

In the disclosure, the meaning that the UE discontinues UL transmission to the source BS via the protocol layers of the first bearer and discontinues DL data reception from the source BS may mean that the UE re-establishes, initializes, or releases the protocol layers (the PHY layer, the MAC layer, the RLC layer, or the PDCP layer) of the first bearer.

In embodiments of the disclosure, for convenience of description, it is described that the UE configures the first bearer for the source BS or the second bearer for the target BS, and embodiments of the disclosure may be easily extended and equally applied to a case in which the UE configures a plurality of first bearers for the source BS or a plurality of second bearers for the target BS. Also, embodiments of the disclosure may be extended and equally applied to a case in which a plurality of bearers for a plurality of target BSs are configured. For example, the UE may configure second bearers while performing a handover procedure on a first target BS, and when handover fails, the UE configures second bearers while performing a handover procedure on a second target BS, such that the UE may autonomously detect and determine cells satisfying a certain condition (e.g., a signal whose strength being equal to or greater than a certain value) from among a plurality of cells, may select one cell and then may perform a handover procedure on the cell.

Figure 1I:
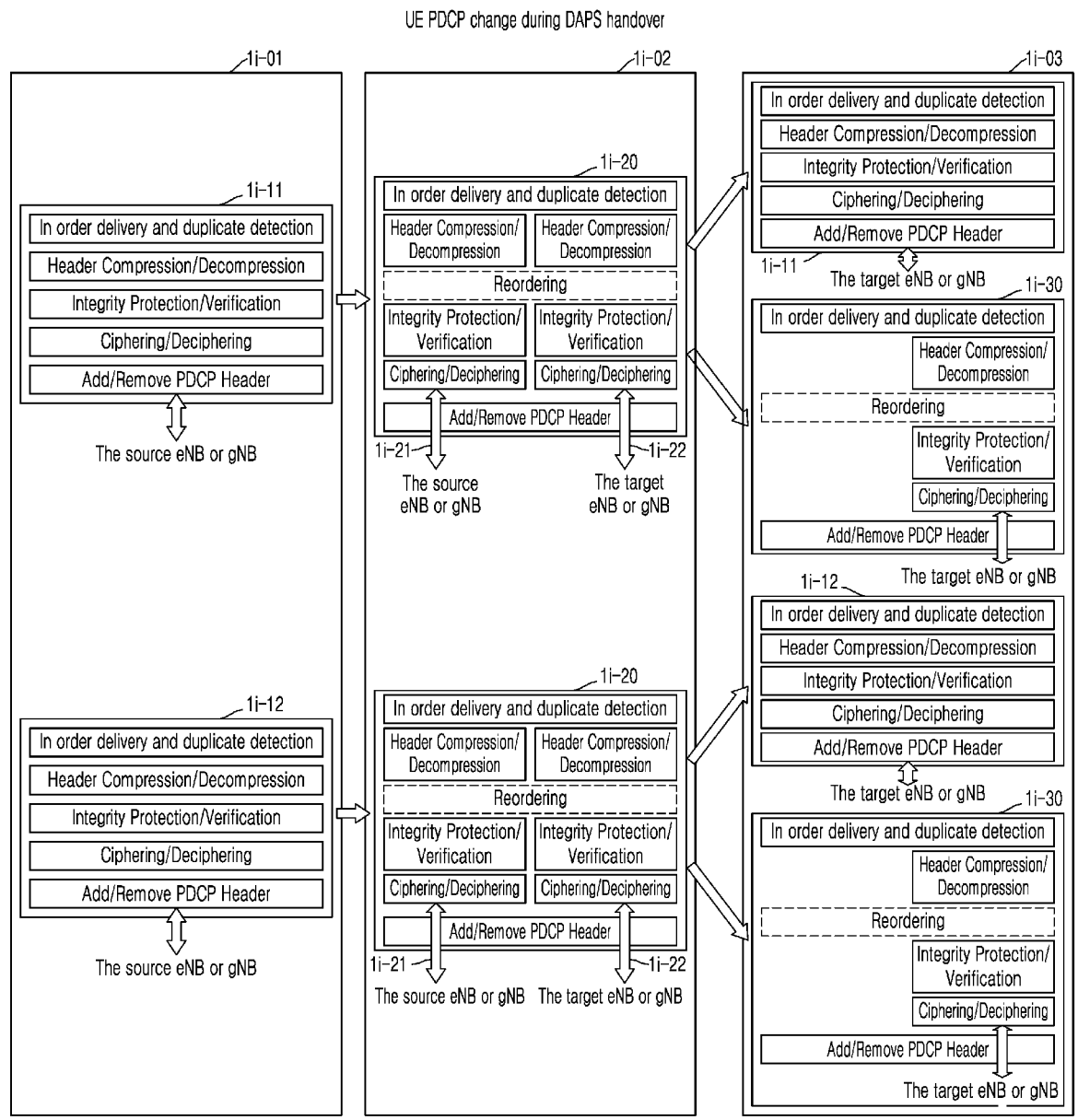
FIG. 1I illustrates architectures of an efficient packet data convergence protocol (PDCP) layer which are to be applied to a dual active protocol stack (DAPS) handover method that is embodiment 2 of the efficient handover method, and a method of applying the architectures, according to an embodiment of the disclosure.

FIG. 1I illustrates architectures of an efficient PDCP layer which are to be applied to the DAPS handover method that is embodiment 2 of the efficient handover method, and a method of applying the architectures, according to an embodiment of the disclosure.

In FIG. 1I, the disclosure proposes particular architectures and functions of the efficient PDCP layer which are to be applied to the DAPS handover method that is embodiment 2 of the efficient handover method provided in the disclosure, and the architectures of the PDCP layer to be provided below are characterized in that, when a DAPS handover procedure is performed, different PDCP layer architectures may be applied to each bearer at different time points.

For example, before the UE receives a handover command message from a BS, the UE may process and transmit or receive data by applying the first PDCP layer architecture and functions 1*i*-11 or 1*i*-12 provided in the disclosure to each bearer (operation 1*i*-01).

However, when the UE receives a handover command message from the BS, and the DAPS handover method provided in the disclosure is indicated in the handover command message or the DAPS handover method is indicated for particular bearers, the UE may process and transmit or receive data by applying the second PDCP layer architecture and function 1*i*-20 provided in the disclosure with respect to each bearer or bearers for which the DAPS handover method is indicated (operation 1*i*-02).

That is, when the UE receives the handover command message from the BS, and the DAPS handover method provided in the disclosure is indicated in the handover command message or the DAPS handover method is indicated for particular bearers, the UE may switch the first PDCP layer architecture or function 1*i*-11 or 1*i*-12, which is used for each bearer, to the second PDCP layer architecture or function 1*i*-20 provided in the disclosure with respect to each bearer or a bearer for which the DAPS handover method is indicated.

As another method, when the first condition provided in the disclosure is satisfied, the UE may switch the first PDCP layer architecture or function 1*i*-11 or 1*i*-12, which is used for each bearer, to the second PDCP layer architecture or function 1*i*-20 provided in the disclosure with respect to each bearer or a bearer for which the DAPS handover method is indicated (operation 1*i*-02).

Also, in a case where the UE receives the handover command message from the BS, and the DAPS handover method provided in the disclosure is indicated in the handover command message, the DAPS handover method is indicated for particular bearers, or a PDCP realignment timer value is newly set, when the UE switches the first PDCP layer architecture or function 1*i*-11 or 1*i*-12 to the second PDCP layer architecture or function 1*i*-20 provided in the disclosure with respect to each bearer or a bearer for which the DAPS handover method is indicated, the UE may update a variable for realignment to a PDCP SN or a COUNT value, which is predicted to be received next, and may stop and restart a realignment timer.

When the second condition provided in the disclosure is satisfied when the UE performs the DAPS handover method provided in the disclosure, the UE may release, from first bearers for the source BS, the second PDCP layer architecture and function 1*i*-20 applied to each bearer or a bearer for which the DAPS handover method is indicated, and may switch back to the first PDCP layer architecture and function 1*i*-11 or 1*i*-12 and may apply the first PDCP layer architecture and function 1*i*-11 or 1*i*-12 to each bearer. When the second condition is satisfied, and the UE switches the second PDCP layer architecture or function 1*i*-20 to the first PDCP layer architecture or function 1*i*-11 or 1*i*-12 provided in the disclosure with respect to each bearer or a bearer for which the DAPS handover method is indicated, the UE may initialize the variable for realignment, and may stop and reset the realignment timer. Also, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. Also, the UE may provide the plurality of items of processed data to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS.

As another method, when the second condition provided in the disclosure is satisfied when the UE performs the DAPS handover method provided in the disclosure, the UE may release, from bearers for the source BS, the second PDCP layer architecture and function 1*i*-20 applied to each bearer or a bearer for which the DAPS handover method is indicated, and may switch to the third PDCP layer architecture or function 1*i*-30 and may apply the third PDCP layer architecture or function 1*i*-30 to each bearer. When the second condition is satisfied and thus the UE switches the second PDCP layer architecture or function 1*i*-20 to the third PDCP layer architecture or function 1*i*-30 provided in the disclosure with respect to each bearer or a bearer for which the DAPS handover method is indicated, the UE may not stop nor initialize but may continuously use the variable for realignment and the realignment timer.

However, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. Also, the UE may provide the plurality of items of processed data to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS.

As provided in FIG. 1I of the disclosure, the UE may apply, to each bearer, the first PDCP layer architecture or function 1*i*-11 or 1*i*-12, the second PDCP layer architecture or function 1*i*-20, or the third PDCP layer architecture or function 1*i*-30, which are different from each other, at different time points, such that data loss may be prevented and a data interruption time may be minimized when handover is performed.

The first PDCP layer architecture 1*i*-11 or 1*i*-12 provided in FIG. 1I may have a 1-1 PDCP layer architecture, a 1-2 PDCP layer architecture, a 1-3 PDCP layer architecture, or a 1-4 PDCP layer architecture, which are provided in the disclosure, and may have characteristics to be described below.

First, when the first PDCP layer architecture 1*i*-11 corresponds to the 1-1 PDCP layer architecture, the first PDCP layer architecture 1*i*-11 may have characteristics below.

1> (When it is the 1-1 PDCP layer architecture) for example, when the UE applies the first PDCP layer architecture and function 1*i*-11 to a PDCP layer (e.g., E-UTRA PDCP layer or LTE PDCP layer) connected to an AM RLC layer (e.g., E-UTRA AM RLC layer), the PDCP layer may have characteristics below.

2> The PDCP layer may first perform detection of out-of-window data or duplicate data on a plurality of items of received data. (Retransmission may occur in RLC AM, and sizes of LTE RLC SN and PDCP SN may be different, such that the duplicate data or the out-of-window data may be received. In the above, window indicates a range of PDCP SNs or COUNT values, in which valid data is received.)

3> Before the PDCP layer discards the out-of-window data or the duplicate data, the PDCP layer performs a deciphering procedure and a header decompression procedure and then performs a discard operation. (Because the data may include useful information (e.g., initialization and refresh (IR) packet or header compression information) for the header decompression procedure, the PDCP layer may check and then discard the data.)

2> The PDCP layer may immediately decipher a plurality of items of data without ordering, the data being received without being discarded, and may perform a header decompression procedure. This is because the E-UTRA AM RLC layer performs ordering on the plurality of items of data and provides the plurality of items of data to the PDCP layer.

2> Then, the PDCP layer provides the plurality of items of data to an upper layer in ascending order of COUNT values.

Next, when the first PDCP layer architecture 1*i*-11 corresponds to the 1-2 PDCP layer architecture, the first PDCP layer architecture 1*i*-11 may have characteristics below.

1> (When it is the 1-2 PDCP layer architecture) for example, when the UE applies the first PDCP layer architecture and function 1*i*-11 to the PDCP layer (e.g., the E-UTRA PDCP layer or the LTE PDCP layer) connected to an UM RLC layer (e.g., E-UTRA UM RLC layer), the PDCP layer may have characteristics below.

2> The PDCP layer may not perform a procedure of detecting out-of-window data or duplicate data. This is because the UM E-UTRA RLC layer does not perform a retransmission procedure.

2> Then, the PDCP layer may immediately perform a deciphering procedure and then a header decompression procedure on the plurality of items of received data.

2> Then, the PDCP layer may perform a reordering procedure and may provide the plurality of items of data to the upper layer (e.g., in ascending order).

Next, when the first PDCP layer architecture 1*i*-11 corresponds to the 1-3 PDCP layer architecture, the first PDCP layer architecture 1*i*-11 may have characteristics below.

1> (When it is the 1-3 PDCP layer architecture) for example, when the UE applies the first PDCP layer architecture 1*i*-11 to the PDCP layer (e.g., the E-UTRA PDCP layer or the LTE PDCP layer) configured with a split bearer, a packet duplication bearer, or a LTE WLAN Aggregation (LWA) bearer, a reordering procedure and a realignment timer may always be applied and the PDCP layer may have characteristics below.

2> The PDCP layer may first perform detection of out-of-window data or duplicate data on a plurality of items of received data. (Retransmission may occur in RLC AM, data may be received at different time points from different RLC layers, and sizes of LTE RLC SN and PDCP SN may be different, such that the out-of-window data or the duplicate data may be received.)

3> The PDCP layer performs a deciphering procedure. However, the PDCP layer may not perform a header decompression procedure. (It is because the E-UTRA PDCP layer cannot configure a header compression protocol to the split bearer or an LWA bearer.

3> When an integrity protection or verification procedure has been performed, the PDCP layer may perform the integrity protection verification procedure and then may discard data. When the integrity verification procedure fails, the PDCP layer may discard the data and may report the failure to an upper layer.

3> The PDCP layer discards the out-of-window data or the duplicate data.

2> When the data is not discarded, the PDCP layer may immediately perform a deciphering procedure without reordering on a plurality of items of received data. Afterward, when the integrity protection or verification procedure is configured, the PDCP layer may perform integrity verification. When the integrity protection or verification procedure is performed, the PDCP layer may perform the integrity protection or verification procedure and then may discard data. When the integrity verification procedure fails, the PDCP layer may discard the data and may report the failure to the upper layer.

2> Afterward, the PDCP layer may perform reordering on a plurality of items of received data, and when PDCP SNs or COUNT values are sequentially aligned in ascending order without a gap therebetween, the PDCP layer may perform a header compression procedure (when the header compression procedure or a header decompression procedure is configured) and may provide the data to the upper layer in ascending order.

2> In a case where a realignment timer is running,

3> when data is provided to the upper layer, the data corresponding to COUNT value having the same value as a value obtained by subtracting 1 from a value a variable for realignment maintains, or when the plurality of items of data are all provided to the upper layer without a gap between PDCP SNs (COUNT values), 4> The PDCP layer stops and resets the realignment timer.

2> In a case where the realignment timer is not running,

3> when a buffer stores data that is not provided to the upper layer, or when there is a gap between PDCP SNs (COUNT values), 4> The PDCP layer starts the realignment timer.

4> Then, the PDCP layer updates the variable for realignment to a PDCP SN or a COUNT value which is predicted to be received next time.

2> In a case where the realignment timer is expired,

3> When a header decompression procedure is configured to values of a plurality of items of stored data, the values being smaller than the variable for realignment, in ascending order of PDCP SNs or COUNT values, the PDCP layer performs the header decompression procedure and provides the data to the upper layer.

3> When a header decompression procedure is configured to values of a plurality of items of stored data, the values being equal to or greater than the variable for realignment, in ascending order of PDCP SNs or COUNT values, the PDCP layer performs the header decompression procedure and provides the data to the upper layer.

3> Then, the PDCP layer updates a variable value of data, which is most recently provided to the upper layer, to a PDCP SN or a COUNT value of the data most recently provided to the upper layer.

3> when a buffer stores data that is not provided to the upper layer, or when there is a gap between PDCP SNs (COUNT values), 4> The PDCP layer starts the realignment timer.

4> Then, the PDCP layer updates the variable for realignment to a PDCP SN or a COUNT value which is predicted to be received next time.

First, when the first PDCP layer architecture 1*i*-11 corresponds to the 1-4 PDCP layer architecture, the first PDCP layer architecture 1*i*-11 may have characteristics below.

1> (When it is the 1-4 PDCP layer architecture) for example, when the UE applies the first PDCP layer architecture and function 1*i*-11 to a PDCP layer (e.g., E-UTRA PDCP layer or LTE PDCP layer) connected to an AM RLC layer (e.g., E-UTRA AM RLC layer), the PDCP layer may have characteristics below.

2> The PDCP layer may first perform a deciphering procedure on a plurality of items of received data.

2> When an integrity protection or verification procedure is configured, the PDCP layer may perform the integrity protection or verification procedure on the received data, and when the integrity verification procedure fails, the PDCP layer may discard the data and may report the failure to an upper layer.

2> The PDCP layer performs detection of out-of-window data or duplicate data on the received data. (The disclosure may be characterized in that the deciphering procedure is first performed and then the detection of out-of-window data or duplicate data is performed. As another method, the deciphering procedure may be performed only when the integrity protection or verification procedure is configured. In a case where the detection of out-of-window data or duplicate data is performed but the integrity protection or verification procedure is not configured, the deciphering procedure may be performed only on a plurality of items of data on which the detection of out-of-window data or duplicate data is performed and that are not discarded.)

3> The PDCP layer discards the out-of-window data or the duplicate data.

2> When the data is not discarded, the PDCP layer may perform reordering on a plurality of items of received data, and when PDCP SNs or COUNT values are sequentially aligned in ascending order without a gap therebetween, the PDCP layer may perform a header compression procedure (when the header compression procedure or a header decompression procedure is configured) and may provide the data to the upper layer in ascending order.

2> When the PDCP layer provides the data to the upper layer, the PDCP layer provides the data in ascending order of COUNT values.

2> In a case where a realignment timer is running,

3> when data is provided to the upper layer, the data corresponding to COUNT value having the same value as a value obtained by subtracting 1 from a value a variable for realignment maintains, when the plurality of items of data are all provided to the upper layer without a gap between PDCP SNs (COUNT values), or when a value of a variable storing a PDCP SN or a COUNT value of data to be provided to the upper layer is equal to or greater than a value of a variable for realignment, 4> The PDCP layer stops and resets the realignment timer.

2> In a case where the realignment timer is not running,

3> when a buffer stores data that is not provided to the upper layer, when there is a gap between PDCP SNs (COUNT values), or when a value of a variable storing a COUNT value of first data that is not provided to the upper layer is smaller than a value of a variable for realignment, 4> the PDCP layer updates the variable for realignment to a PDCP SN or a COUNT value which is predicted to be received next time.

4> the PDCP layer starts the realignment timer.

2> In a case where the realignment timer is expired,

3> When a header decompression procedure is configured to values of a plurality of items of stored data, the values being smaller than the variable for realignment, in ascending order of PDCP SNs or COUNT values, the PDCP layer performs the header decompression procedure and provides the data to the upper layer.

3> When a header decompression procedure is configured to values of a plurality of items of stored data, the values being equal to or greater than the variable for realignment, in ascending order of PDCP SNs or COUNT values, the PDCP layer performs the header decompression procedure and provides the data to the upper layer.

3> Then, the PDCP layer updates a variable value of first data, which is not provided to the upper layer, to a PDCP SN or a COUNT value of the first data that is not provided to the upper layer.

3> when a buffer stores data that is not provided to the upper layer, or when there is a gap between PDCP SNs (COUNT values), or when a value of a variable storing the COUNT value of the first data that is not provided to the upper layer is smaller than the value of the variable for realignment, 4> the PDCP layer updates the variable for realignment to a PDCP SN or a COUNT value which is predicted to be received next time.

4> The PDCP layer starts the realignment timer.

The second PDCP layer architecture or function 1$i$-20 provided in FIG. 1I may have a 2-1 PDCP layer architecture or a 2-2 PDCP layer architecture, which are provided in the disclosure, and may have characteristics to be described below.

In the disclosure, provided is the second PDCP layer architecture 1$i$-20 which is efficient in handover. The second PDCP layer architecture may be applied to embodiment 2 of the efficient handover method for minimizing a data interruption time, which is provided in the disclosure.

In the second PDCP layer architecture, the UE may perform data transmission or reception from or to a source BS 1$i$-21 via protocol layers (e.g., an SDAP layer, a PDCP layer, an RLC layer, or a MAC layer) of a first bearer, and may perform data transmission or reception from or to a target BS 1$i$-22 via protocol layers (e.g., an SDAP layer, a PDCP layer, an RLC layer, or a MAC layer) of a second bearer.

The PDCP layer of the first bearer and the PDCP layer of the second bearer may each be configured in the UE but may logically operate as one PDCP layer as shown in 1$i$-20. In detail, by distinguishing between functions of a PDCP layer, one PDCP layer may be implemented as functions (e.g., an SN allocation function, a reordering(realignment) function, an in-sequence delivery function, or a duplicate detection function) of an upper PDCP layer and functions (e.g., a deciphering or ciphering function, a header (or data) compression or decompression function, an integrity protection or verification function, or a duplicate detection function) of two lower PDCP layers respectively for the source BS and the target BS. Also, as provided above, when the DAPS handover method is performed, the UE may transmit UL data transmission to the source BS, and when the first condition is satisfied, the UE may switch to the target BS and may continuously receive DL data from the source BS and the target BS. Therefore, only one header (or data) compression protocol context for the source BS or the target BS may be maintained and applied to a UL, and two contexts for the source BS or the target BS may be maintained and applied to a DL.

The 2-1 PDCP layer architecture (e.g., an E-UTRA PDCP layer for the DAPS handover method) provided in the disclosure, based on the second PDCP layer architecture, may have characteristics below.

An upper transmit PDCP layer function may serve to allocate PDCP SNs to a plurality of items of data received from an upper layer. Two lower transmit PDCP layer functions 1$i$-21 and 1$i$-22 respectively for the source BS and the target BS may apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. Also, when integrity protection is configured, the lower transmit PDCP layer functions 1$i$-21 and 1$i$-22 may apply a ciphering procedure by applying an integrity protection procedure to a PDCP header and data (PDCP SDU), may provide the data to be transmitted to the source BS to a transmit RLC layer of the first bearer, and may provide the data to be transmitted to the target BS to a transmit RLC layer of the second bearer, thereby performing transmission.

In order to accelerate a data processing speed, the two lower transmit PDCP layer functions 1$i$-21 and 1$i$-22 may parallel process header compression, integrity protection, and a ciphering procedure. Also, the two lower transmit PDCP layer functions 1$i$-21 and 1$i$-22 may perform the integrity protection or the ciphering procedure by using different security keys. Also, the two lower transmit PDCP layer functions 1$i$-21 and 1$i$-22 may perform compression, integrity protection, or a ciphering procedure on a plurality of items of different data by applying different compression contexts, different security keys, or different security algorithms in logically-one transmit PDCP layer.

A receive PDCP layer function (i.e., the lower receive PDCP layer functions 1$i$-21 and 1$i$-22 for the source BS or the target BS) may each independently perform an out-of-window data detection or duplicate detection procedure on a plurality of items of data received from each of RLC layers, based on PDCP SNs or COUNT values, with respect to a plurality of items of data received from each of lower layers, in particular, with respect to a plurality of items of data received from two RLC layers for each of the source BS and the target BS. As another method, for convenience of implementation, the receive PDCP layer function may perform the out-of-window data detection or duplicate detection procedure based on PDCP SNs or COUNT values on all received data, without distinguishing between the RLC layers.

As another method, for more accurate duplicate detection, the receive PDCP layer function may perform the out-of-window data detection based on PDCP SNs or COUNT values on all received data, without distinguishing between the RLC layers, and may separately perform the duplicate detection procedure on a plurality of items of data received from each of the RLC layers. As another method, when a plurality of items of data received from different BSs are overlapped with each other, in order to prevent data loss for a header compression protocol, the receive PDCP layer function may perform the out-of-window data detection based on PDCP SNs or COUNT values on all received data without distinguishing between the RLC layers, and may perform the duplicate detection procedure on all data after a deciphering procedure, an integrity protection procedure, or a header (or data) decompression procedure is received with respect to a plurality of items of data received from each of the RLC layers.

When it is configured to immediately apply a deciphering procedure and integrity protection to a plurality of items of received data, the deciphering procedure and integrity protection being performed by using separate header (or data) compression context or security key separately configured with the source BS and the target BS, sub-functions of the receive PDCP layer may apply an integrity protection procedure on the PDCP header and the data (PDCP SDU).

In the 2-1 PDCP layer architecture, a header (or data) decompression procedure may be immediately performed, without reordering, on a plurality of items of data received from RLC layers of the first bearer for the source BS, and a header (or data) decompression procedure may be immediately performed, without reordering, on a plurality of items of data received from RLC layers of the second bearer for the target BS. Also, to distinguish between the data received from the RLC layers of the first bearer for the source BS and the data received from the RLC layers of the second bearer for the target BS, an indicator is defined for each data such that it is possible to identify whether the PDCP layer received data from the source BS or received data from the target BS. As another method, a 1-bit indicator is defined in a PDCP header, an SDAP header, or an RLC header, such that it is possible to identify whether the PDCP layer received data from the source BS or received data from the target BS.

Also, the PDCP layer may perform the duplicate detection procedure based on a PDCP SN or a COUNT value (a procedure in which only one data (including pre-received data or data provided to the upper layer) is allocated for each PDCP SN or each COUNT value and the others are all discarded) on all of the plurality of items of data received from RLC layers of the first bearer for the source BS and the plurality of items of data received from RLC layers of the second bearer for the target BS, wherein the header (or data) compression procedure has been completed with respect to the plurality of items of data. Then, the PDCP layer may perform a realignment procedure on all of the plurality of items of data received from RLC layers of the first bearer for the source BS and the plurality of items of data received from RLC layers of the second bearer for the target BS, in ascending order based on PDCP SNs or COUNT values, and may sequentially provide the plurality of items of data to the upper layer. Because the PDCP layer can receive data in no order from different BSs, i.e., from the first bearer or the second bearer, the PDCP layer may have to always perform the realignment procedure.

In order to accelerate a data processing speed, the two lower transmit PDCP layer functions 1$i$-21 and 1$i$-22 may parallel process header compression, integrity protection, and a ciphering procedure, based on each PDCP SN or each COUNT value. Also, the two lower transmit PDCP layer functions 1$i$-21 and 1$i$-22 may perform the integrity protection, the ciphering procedure, or the header decompression procedure by using different header (or data) compression contexts or different security keys. Also, the two lower transmit PDCP layer functions 1$i$-21 and 1$i$-22 may perform the integrity protection, the ciphering procedure, or the decompression procedure on a plurality of items of different data by applying different header (or data) compression contexts, different security keys, or different security algorithms in logically-one transmit PDCP layer. Also, the two lower transmit PDCP layer functions 1$i$-21 and 1$i$-22 may perform out-of-sequence deciphering or integrity verification procedure on each of a plurality of items of data received without relation to order of PDCP SNs or COUNT values.

When a PDCP layer distinguishes layers of the first bearer from layers of the second bearer, the PDCP layer may distinguish the layers (or a first RLC layer) of the first bearer from the layers (or a second RLC layer) of the second bearer, in consideration that the layer of the first bearer and the layer of the second bearer are connected to different MAC layers, have different logical channel identifiers, are different RLC layers connected to different MAC layers, or use different ciphering keys. By doing so, a ciphering procedure or a deciphering procedure may be performed on UL data and DL data by using different security keys, and the UL data and the DL data may be compressed or decompressed by using different compression protocol contexts.

The 2-2 PDCP layer architecture (e.g., an NR PDCP layer for the DAPS handover method) provided in the disclosure, based on the second PDCP layer architecture, may have characteristics below.

An upper transmit PDCP layer function may serve to allocate PDCP SNs to a plurality of items of data received from an upper layer. The two lower transmit PDCP layer functions 1$i$-21 and 1$i$-22 respectively for the source BS and the target BS may apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. Also, when integrity protection is configured, the lower transmit PDCP layer functions 1$i$-21 and 1$i$-22 may apply a ciphering procedure by applying an integrity protection procedure to a PDCP header and data (PDCP SDU), may provide the data to be transmitted to the source BS to a transmit RLC layer of the first bearer, and may provide the data to be transmitted to the target BS to a transmit RLC layer of the second bearer, thereby performing transmission.

In order to accelerate a data processing speed, the two lower transmit PDCP layer functions 1$i$-21 and 1$i$-22 may parallel process header compression, integrity protection, and a ciphering procedure. Also, the two lower transmit PDCP layer functions 1$i$-21 and 1$i$-22 may perform the integrity protection or the ciphering procedure by using different security keys. Also, the two lower transmit PDCP layer functions 1$i$-21 and 1$i$-22 may perform compression, integrity protection, or a ciphering procedure on a plurality of items of different data by applying different compression contexts, different security keys, or different security algorithms in logically-one transmit PDCP layer.

A receive PDCP layer function (i.e., the lower receive PDCP layer functions 1$i$-21 and 1$i$-22 for the source BS or the target BS) may each independently perform an out-of-window data detection or duplicate data detection procedure on a plurality of items of data received from each of RLC layers, based on PDCP SNs or COUNT values, with respect to a plurality of items of data received from each of lower layers, in particular, with respect to a plurality of items of data received from two RLC layers for each of the source BS and the target BS. As another method, for convenience of implementation, the receive PDCP layer function may perform the out-of-window data detection or duplicate detection procedure based on PDCP SNs or COUNT values on all received data, without distinguishing between the RLC layers.

As another method, for more accurate duplicate detection, the receive PDCP layer function may perform the out-of-window data detection based on PDCP SNs or COUNT values on all received data, without distinguishing between the RLC layers, and may separately perform the duplicate detection procedure on a plurality of items of data received from each of the RLC layers. As another method, when a plurality of items of data received from different BSs are overlapped with each other, in order to prevent data loss for a header compression protocol, the receive PDCP layer function may perform the out-of-window data detection based on PDCP SNs or COUNT values on all received data without distinguishing between the RLC layers, and may perform the duplicate detection procedure on all data after a deciphering procedure, an integrity protection procedure, or a header (or data) decompression procedure is received with respect to a plurality of items of data received from each of the RLC layers.

When it is configured to immediately apply a deciphering procedure and integrity protection to a plurality of items of received data, the deciphering procedure and integrity protection being performed by using separate header (or data) compression context or security key separately configured with the source BS and the target BS, sub-functions of the receive PDCP layer may apply an integrity protection procedure on the PDCP header and the data (PDCP SDU).

In the 2-2 PDCP layer architecture, a reordering procedure may be performed on a plurality of items of data received from RLC layers of the first bearer for the source BS and a plurality of items of data received from RLC layers of the second bearer for the target BS, and may perform a header (or data) decompression procedure on the plurality of items of data received from each BS (the source BS or the target BS) in ascending order of PDCP SNs or COUNT values, by applying header (or data) compression context of each BS (the source BS or the target BS). Also, to distinguish between the data received from the RLC layers of the first bearer for the source BS and the data received from the RLC layers of the second bearer for the target BS, an indicator is defined for each data such that it is possible to identify whether the PDCP layer received data from the source BS or received data from the target BS. As another method, a 1-bit indicator is defined in a PDCP header, an SDAP header, or an RLC header, such that it is possible to identify whether the PDCP layer received data from the source BS or received data from the target BS. Also, the PDCP layer may perform the duplicate detection procedure based on a PDCP SN or a COUNT value (a procedure in which only one data (including pre-received data or data provided to the upper layer) is allocated for each PDCP SN or each COUNT value and the others are all discarded) on all of the plurality of items of data received from RLC layers of the first bearer for the source BS and the plurality of items of data received from RLC layers of the second bearer for the target BS, wherein the header (or data) compression procedure has been completed with respect to the plurality of items of data. Then, the PDCP layer may sequentially provide, to the upper layer, all of the plurality of items of data received from RLC layers of the first bearer for the source BS and the plurality of items of data received from RLC layers of the second bearer for the target BS, in ascending order based on PDCP SNs or COUNT values. Because the PDCP layer can receive data in no order from different BSs, i.e., from the first bearer or the second bearer, the PDCP layer may have to always perform a realignment procedure.

In order to accelerate a data processing speed, the two lower transmit PDCP layer functions 1$i$-21 and 1$i$-22 may parallel process header compression, integrity protection, and a ciphering procedure, based on each PDCP SN or each COUNT value. Also, the two lower transmit PDCP layer functions 1$i$-21 and 1$i$-22 may perform the integrity protection, the ciphering procedure, or the header decompression procedure by using different header (or data) compression contexts or different security keys. Also, the two lower transmit PDCP layer functions 1i-21 and 1i-22 may perform the integrity protection, the ciphering procedure, or the decompression procedure on a plurality of items of different data by applying different header (or data) compression contexts, different security keys, or different security algorithms in logically-one transmit PDCP layer. Also, the two lower transmit PDCP layer functions 1i-21 and 1i-22 may perform out-of-sequence deciphering or integrity verification procedure on each of a plurality of items of data received without relation to order of PDCP SNs or COUNT values.

When a PDCP layer distinguishes layers of the first bearer from layers of the second bearer, the PDCP layer may distinguish the layers (or a first RLC layer) of the first bearer from the layers (or a second RLC layer) of the second bearer, in consideration that the layer of the first bearer and the layer of the second bearer are connected to different MAC layers, have different logical channel identifiers, are different RLC layers connected to different MAC layers, or use different ciphering keys. By doing so, a ciphering procedure or a deciphering procedure may be performed on UL data and DL data by using different security keys, and the UL data and the DL data may be compressed or decompressed by using different compression protocol contexts.

In the disclosure, provided is a third PDCP layer architecture 1i-30 which is efficient in handover. The third PDCP layer architecture may be applied to embodiment 2 of the efficient handover method for minimizing a data interruption time, which is provided in the disclosure. A PDCP layer function in the third PDCP layer architecture provided in the disclosure may be equal to the second PDCP layer architecture provided in the disclosure.

However, the third PDCP layer architecture may correspond to architecture from which the first bearer for the source BS in the second PDCP layer architecture is released. In detail, the third PDCP layer architecture provided in the disclosure may have same functions as those of the second PDCP layer architecture but may have architecture from which the first bearer (e.g., the SDAP layer, the PDCP layer, the RLC layer, or the MAC layer) for the source BS in the second PDCP layer architecture is released. Therefore, the third PDCP layer architecture may be characterized in that QoS mapping information of the SDAP layer for the source BS, security key information for the PDCP layer for the source BS, header (or data) compression context information for the source BS, or the RLC layer or the MAC layer for the source BS is released.

Figure 1J:
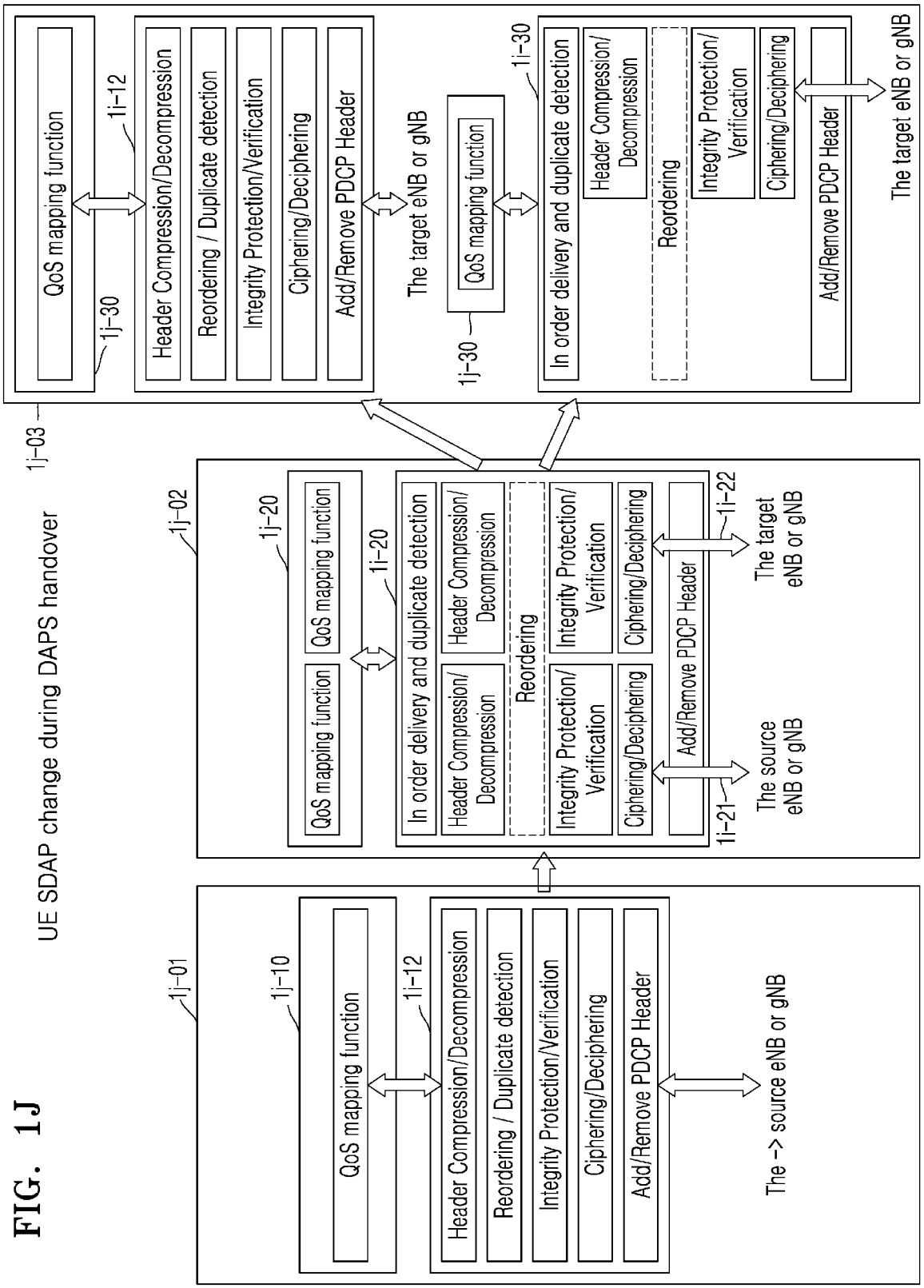
FIG. 1J illustrates architectures of an efficient service data adaptation protocol (SDAP) layer which are to be applied to the DAPS handover method that is embodiment 2 of the efficient handover method, and a method of applying the architectures, according to an embodiment of the disclosure.

FIG. 1J illustrates architectures of an efficient SDAP layer which are to be applied to the DAPS handover method that is embodiment 2 of the efficient handover method, and a method of applying the architectures, according to an embodiment of the disclosure.

In FIG. 1J, the disclosure proposes particular architectures and functions of the efficient SDAP layer which are to be applied to the DAPS handover method that is embodiment 2 of the efficient handover method provided in the disclosure, and the architectures of the SDAP layer to be provided below are characterized in that, when a DAPS handover procedure is performed, different SDAP layer architectures may be applied to each bearer at different time points.

For example, before the UE receives a handover command message from a BS, the UE may process and transmit or receive data by applying the first SDAP layer architecture and functions 1j-10 provided in the disclosure to each bearer (operation 1j-01).

In the first SDAP layer architecture, the SDAP layer may perform data processing (e.g., a procedure of reading SDAP header information and updating mapping information or configuring an SDAP header, or routing or providing the processed information to an upper layer or a lower layer which is appropriate based on the first QoS flow and the bearer mapping information) on a plurality of items of UL data to be transmitted or a plurality of items of received DL data (e.g., a plurality of items of data received from the source BS) by maintaining and applying a first QoS flow and bearer mapping information for the source BS.

However, when the UE receives a handover command message from the BS, and the DAPS handover method provided in the disclosure is indicated in the handover command message or the DAPS handover method is indicated for particular bearers, the UE may process and transmit or receive data by applying the second PDCP layer architecture and function 1j-20 provided in the disclosure with respect to each bearer or bearers for which the DAPS handover method is indicated (operation 1j-02).

That is, when the UE receives the handover command message from the BS, and the DAPS handover method provided in the disclosure is indicated in the handover command message or the DAPS handover method is indicated for particular bearers, the UE may switch the first SDAP layer architecture or function 1j-10, which is used for each bearer, to the second SDAP layer architecture or function 1j-20 provided in the disclosure with respect to each bearer or a bearer for which the DAPS handover method is indicated.

As another method, when the first condition provided in the disclosure is satisfied, the UE may switch the first SDAP layer architecture or function 1j-10, which is used for each bearer, to the second SDAP layer architecture or function 1j-20 provided in the disclosure with respect to each bearer or a bearer for which the DAPS handover method is indicated (operation 1j-02).

Also, when the UE receives the handover command message from the BS, and the DAPS handover method provided in the disclosure is indicated in the handover command message, the DAPS handover method is indicated for particular bearers, or a QoS flow and bearer mapping information are newly set, the UE may switch the first SDAP layer architecture or function 1j-10 to the second SDAP layer architecture or function 1j-20 provided in the disclosure with respect to each bearer or a bearer for which the DAPS handover method is indicated.

Also, in the second SDAP layer architecture, an existing first QoS flow and existing bearer mapping information for the source BS are maintained such that UL data to be transmitted to the source BS and DL data to be received from the source BS may be processed. Also, in the second SDAP layer architecture, a second QoS flow and the bearer mapping information that are newly configured in the handover command message are configured for the target BS and may be used to process UL data to be transmitted to the target BS S and DL data to be received from the target BS.

That is, in the second SDAP layer architecture provided in the disclosure, the first QoS flow and the bearer mapping information for the source BS or the second QoS flow and the bearer mapping information for the target BS are maintained such that data for the source BS and data for the target BS may be separately processed. In the second SDAP layer architecture, an SDAP layer may identify whether data received from a lower layer is data received from the source BS or data received from the target BS, by using a 1-bit indicator of an SDAP header, a 1-bit indicator of a PDCP header, or information indicated by the PDCP layer.

When the source BS indicates the DAPS handover method with respect to each bearer to the UE by using the handover command message, the DAPS handover method is always indicated with respect to a default DRB, and when data occurs in a new QoS flow that does not correspond to a QoS flow and bearer mapping information when a DAPS handover procedure is performed, the UE may be indicated to always transmit UL data via the default bearer. When the DAPS handover method is not configured for the default bearer, UL data transmission with respect to a new QoS flow occurred in handover is impossible such that a data interruption time may occur.

When the second condition provided in the disclosure is satisfied when the UE performs the DAPS handover method provided in the disclosure, the UE may release, from first bearers for the source B S, the second SDAP layer architecture and function 1j-20 applied to each bearer or a bearer for which the DAPS handover method is indicated, and may switch back to the first SDAP layer architecture and function 1j-10 and may apply the first SDAP layer architecture and function 1j-10 to each bearer. When the second condition is satisfied, the UE may switch the second SDAP layer architecture or function 1j-20 to the first SDAP layer architecture or function 1j-10 provided in the disclosure with respect to each bearer or a bearer for which the DAPS handover method is indicated. Also, it is characterized that the UE maintains the second bearer or the second QoS flow and the bearer mapping information for the target BS, and before the UE releases the first bearer or the first QoS flow and the bearer mapping information for the source BS, the UE may complete data processing with respect to the plurality of items of data received from the source BS (e.g., all data received from the source BS) and then may release the first QoS flow and the bearer mapping information or the first bearer. Also, the UE may provide the plurality of items of processed data to the upper layer in ascending order.

That is, when the second condition is satisfied, the UE may perform data processing (for example, the UE performs a procedure of reading SDAP header information and updating mapping information or configuring an SDAP header, or routing or providing the processed information to an upper layer or a lower layer which is appropriate based on the first QoS flow and the bearer mapping information) by applying the first QoS flow and the bearer mapping information for the source BS to a plurality of items of data stored in the buffer (e.g., a plurality of items of data received from the source BS), and may discard the first QoS flow and the bearer mapping information for the source BS.

The SDAP layer may define and apply information indicated by a 1-bit indicator of a new SDAP header, a 1-bit indicator of a new PDCP header, SDAP control data (e.g., DL End marker), or the PDCP layer, and may identify which data is most recently received from the source BS, based on the information. Therefore, the SDAP layer may perform data processing on the data by applying the first QoS flow and the bearer mapping information for the source BS, the data being most recently received from the source BS, and then may discard the first QoS flow and the bearer mapping information for the source BS. Then, the SDAP layer may continuously maintain the second QoS flow and the bearer mapping information and may process UL data or DL data with respect to the target BS, based on the second QoS flow and the bearer mapping information.

Hereinafter, provided is a method of applying bearer configuration information using different schemes according to a type of handover indicated in a handover command message, when the UE receives the handover command message and applies the bearer configuration information included in the handover command message in FIG. 1F according to an embodiment of the disclosure.

In a case where the UE receives the handover command message, when ReconfigWithSync information indicates a first handover method (e.g., embodiment 1 of the disclosure or a normal handover method), the UE may apply the bearer configuration information by using methods 1 below) When a default bearer is configured in SDAP layer configuration information configured in the handover command message, the UE may configure a default bearer for a source BS as the default bearer for a target BS which is indicated in the configuration information.

2) When a second QoS flow and bearer mapping information are configured in the SDAP layer configuration information configured in the handover command message, the UE may release a first QoS flow and bearer mapping information applied for the source BS and may apply the second QoS flow and the bearer mapping information. As another method, the UE may replace the first QoS flow and bearer mapping information applied for the source BS with the second QoS flow and the bearer mapping information.

3) When a data discard timer value is configured in PDCP layer configuration information configured in the handover command message, the UE may apply the discard timer value to a PDCP layer corresponding to a bearer identifier of the configuration information.

4) When the UE receives the handover command message, the UE may re-establish a PDCP layer. For example, the UE may initialize window state variables with respect to an SRB and may discard a plurality of items of stored data (PDCP SDU or PDCP PDU). Also, the UE may initialize window state variables with respect to a UM DRB, may perform, in ascending order of COUNT values, compression, ciphering, or integrity protection on a plurality of items of data that are not transmitted to a lower layer yet or for which a PDCP discard timer is not expired, based on header (or data) compression context or security key of the target BS, and then may transmit or retransmit the data. Also, when a realignment timer is running, the UE may stop and reset the realignment timer, may process the plurality of items of received data (PDCP SDU or PDCP PDU) in order, and may provide the data to an upper layer. Also, the UE does not initialize window state variables with respect to an AM DRB, may perform, based on header (or data) compression context or security key of the target BS, compression, ciphering, or integrity protection on data starting from first data (PDCP SDU or PDCP PDU) for which successful delivery is not acknowledged by a lower layer, in ascending order of PDCP SNs or COUNT values.

5) When drb-ContinueROHC indicator is configured as False in the PDCP layer configuration information configured in the handover command message, the UE may initialize context of header compression or decompression protocol in a PDCP layer corresponding to a bearer identifier of the configuration information. When drb-ContinueROHC indicator is configured as True, the UE does not initialize the context of header compression or decompression protocol in the PDCP layer corresponding to the bearer identifier of the configuration information.

6) When a realignment timer value is configured in the PDCP layer configuration information configured in the handover command message, the UE may apply the realignment timer value to the PDCP layer corresponding to the bearer identifier of the configuration information.

7) When security key configuration information or security algorithm is configured in security configuration information configured in the handover command message, the UE may derive a new security key or new security configuration information by using the configuration information, may release an existing security key or existing security configuration information, or may replace the existing security key or the existing security configuration information with the new security key or the new security configuration information.

8) When a new logical channel identifier is configured in RLC layer configuration information configured in the handover command message, the UE may release an existing logical channel identifier corresponding to a bearer identifier indicated in the RLC layer configuration information, or may replace the existing logical channel identifier with the new logical channel identifier.

9) When an RLC re-establishment procedure is configured in the RLC layer configuration information configured in the handover command message, the UE may perform the RLC re-establishment procedure on an RLC layer corresponding to a bearer identifier indicated in the RLC layer configuration information.

10) When the RLC layer configuration information configured in the handover command message is newly configured, the UE may perform the RLC re-establishment procedure on an RLC layer corresponding to a bearer identifier indicated in the RLC layer configuration information.

11) When a second priority with respect to a logical channel is newly configured in MAC layer configuration information configured in the handover command message, the UE may release a first priority corresponding to an identifier of the logical channel indicated in the configuration information, or may replace the first priority corresponding to the logical channel identifier with the newly configured second priority.

12) When a second prioritisedBitRate (PBR) with respect to a logical channel is newly configured in the MAC layer configuration information configured in the handover command message, the UE may release first prioritisedBitRate (PBR) corresponding to an identifier of the logical channel indicated in the configuration information, or may replace the first prioritisedBitRate (PBR) corresponding to the identifier of the logical channel with the newly configured second prioritisedBitRate (PBR). The prioritisedBitRate refers to a value that increases with respect to each logical channel at preset time intervals (e.g., at every TTI). When the UE receives a UL transmit resource, the UE may perform a logical channel prioritization (LCP) procedure and may transmit data with respect to the logical channel, in consideration of a priority and the prioritisedBitRate. In this regard, the higher the priority is, or the greater the value of the prioritisedBitRate is, more data may be transmitted.

13) When second bucketSizeDuration with respect to a logical channel is newly configured in the MAC layer configuration information configured in the handover command message, the UE may release first bucketSizeDuration corresponding to an identifier of the logical channel indicated in the configuration information or may perform configuration by replacing the first bucketSizeDuration corresponding to the identifier of the logical channel with the newly configured second bucketSizeDuration. In the descriptions above, a bucket size indicates a maximum value a value of prioritisedBitRate can have when the prioritisedBitRate is accumulated.

14) When second available SCell information, available subcarrier spacing information, maximum PUSCH duration, or logical channel group configuration information is configured in the MAC layer configuration information config- ured in the handover command message, the UE may release pre-configured first available SCell information, pre-configured available subcarrier spacing information, pre-configured maximum PUSCH duration, or pre-configured logical channel group configuration information, or may perform configuration by replacing the pre-configured first available SCell information, the pre-configured available subcarrier spacing information, the pre-configured maximum PUSCH duration, or the pre-configured logical channel group configuration information with the newly-configured second available SCell information, the newly-configured available subcarrier spacing information, the newly-configured maximum PUSCH duration, or the newly-configured logical channel group configuration information.

In a case where the UE receives the handover command message, when ReconfigWithSync information indicates a second handover method (e.g., embodiment 2 of the disclosure or the DAPS handover method) or indicates the DAPS handover method with respect to each bearer, the UE may apply bearer configuration information by using methods below.

1) When a default bearer is configured in SDAP layer configuration information configured in the handover command message, the UE may perform the DAPS handover method provided in the disclosure, may maintain an existing default bearer for the source BS by applying the second SDAP layer architecture 1j-20, and may configure default bearer information indicated in the configuration information as a default bearer for the target BS. As another method, when the first condition provided in the disclosure is satisfied, the UE may switch the existing default bearer for the source BS to the default bearer for the target BS which is indicated in the configuration information.

2) When a second QoS flow and bearer mapping information are configured in the SDAP layer configuration information configured in the handover command message, the UE may perform the DAPS handover method provided in the disclosure, may maintain a first QoS flow and bearer mapping information for the source BS by applying the second SDAP layer architecture 1j-20, and may apply the second QoS flow and the bearer mapping information to data for the target BS. Also, when the first condition provided in the disclosure is satisfied, the UE may apply the second QoS flow and the bearer mapping information for the target BS.

3) When a data discard timer value is configured in PDCP layer configuration information configured in the handover command message, the UE may perform the DAPS handover method provided in the disclosure and may apply, by applying the second PDCP layer architecture, the discard timer value to a PDCP layer corresponding to a bearer identifier of the configuration information.

4) When the UE receives the handover command message, the UE may not re-establish a PDCP layer for which the DAPS handover method is indicated and may perform procedures below. For example, the UE may initialize window state variables with respect to an SRB (variable initialization may be skipped to perform fallback when DAPS handover fails) or may discard a plurality of items of stored data (PDCP SDU or PDCP PDU). Also, the UE may not initialize window state variables with respect to an UM DRB, and may continuously perform, to or from the source BS, data transmission or reception on plurality of items of data that are not transmitted to a lower layer yet or for which a PDCP discard timer is not expired. Also, the UE may not initialize window state variables with respect to an AM DRB, and may continuously perform data transmission or reception to or from the source BS.

5) When drb-ContinueROHC indicator is configured as False in the PDCP layer configuration information configured in the handover command message, the UE may perform the DAPS handover method provided in the disclosure, and may, by applying the second PDCP layer architecture, changelessly use header compression or decompression protocol context for the source BS in a PDCP layer corresponding to a bearer identifier of the configuration information, initialize header compression or decompression protocol context for the target BS, and start in an initial state (e.g., an IR state). When drb-ContinueROHC indicator is configured as True, the UE may perform the DAPS handover method provided in the disclosure, and may, by applying the second PDCP layer architecture, changelessly use header compression or decompression protocol context for the source BS in a PDCP layer corresponding to a bearer identifier of the configuration information, and may equally apply header compression or decompression protocol context for the target BS as the header compression or decompression protocol context for the source BS. For example, the UE may copy and changelessly apply the header compression or decompression protocol context for the source BS to the header compression or decompression protocol context for the target BS. As another method, the UE may apply same header compression or decompression protocol context to the target BS or the source BS.

6) When a realignment timer value is configured in the PDCP layer configuration information configured in the handover command message, the UE may perform the DAPS handover method provided in the disclosure, and may apply the realignment timer value to the PDCP layer corresponding to the bearer identifier of the configuration information, by applying the second PDCP layer architecture.

7) When security key configuration information or security algorithm is configured in security configuration information configured in the handover command message, or when an indicator indicating a new procedure is included in the PDCP layer configuration information, the UE may derive a new security key or new security configuration information by using the configuration information, and may perform the DAPS handover method provided in the disclosure. In this regard, the UE may maintain an existing security key or existing security configuration information for the source BS by applying the second PDCP layer architecture, and may configure a security key or security configuration information for the target BS as the new security key or the new security configuration information.

8) When a new logical channel identifier is configured in RLC layer configuration information configured in the handover command message, the UE may perform the DAPS handover method provided in the disclosure. Also, the UE may, by applying the second PDCP layer architecture, maintain an existing logical channel identifier for an RLC layer or a MAC layer of a first bearer for the source BS which corresponds to a bearer identifier indicated in the RLC layer configuration information and may configure the new logical channel identifier, which is indicated in the configuration, for an RLC layer or a MAC layer of a second bearer for the target BS.

9) When an RLC re-establishment procedure is configured in the RLC layer configuration information configured in the handover command message, the UE may perform the DAPS handover method provided in the disclosure, and may, by applying the second PDCP layer architecture, perform the RLC re-establishment procedure on an RLC layer of the first bearer for the source BS which corresponds to the bearer identifier indicated in the RLC layer configuration information.

10) When the RLC layer configuration information configured in the handover command message is newly configured, the UE may perform the DAPS handover method provided in the disclosure, and may, by applying the second PDCP layer architecture, maintain existing RLC configuration information for the RLC layer of the first bearer for the source BS which corresponds to a bearer identifier indicated in the RLC layer configuration information and may configure the RLC layer of the second bearer for the target BS as new RLC layer configuration information indicated in the configuration information.

11) When a second priority with respect to a logical channel is newly configured in MAC layer configuration information configured in the handover command message, the UE may perform the DAPS handover method provided in the disclosure and may apply the second PDCP layer architecture. In this regard, the UE may maintain existing configuration information with respect to the MAC layer of the first bearer for the source BS which corresponds to a bearer identifier indicated above, may configure a new logical channel identifier, which is indicated in the configuration information, to a MAC layer of the second bearer for the target BS, and may configure a newly-configured second priority corresponding to the logical channel identifier indicated in the configuration information. As another method, when the first condition provided in the disclosure is satisfied, the UE may apply the priority order to the MAC layer of the second bearer for the target BS according to each logical channel identifier.

12) When a second prioritisedBitRate (PBR) with respect to a logical channel is newly configured in the MAC layer configuration information configured in the handover command message, the UE may perform the DAPS handover method provided in the disclosure. In this regard, the UE may apply the second PDCP layer architecture and maintain existing configuration information with respect to the MAC layer of the first bearer for the source BS which corresponds to a bearer identifier indicated above, may configure a new logical channel identifier with respect to the MAC layer of the second bearer for the target BS, the new logical channel identifier being indicated in the configuration information, and may configure a newly configured second prioritisedBitRate (PBR) corresponding to the new logical channel identifier indicated in the configuration information. As another method, the UE may start applying the second prioritisedBitRate to the new logical channel identifier in the MAC layer of the second bearer for the target BS after the first condition provided in the disclosure is satisfied (by doing so, when different handover methods are indicated for respective bearers, UL transmit resources may be fairly distributed). The prioritisedBitRate refers to a value that increases with respect to each logical channel at preset time intervals (e.g., at every TTI) when the prioritisedBitRate is applied to each logical channel identifier. When the UE receives a UL transmit resource, the UE may perform an LCP procedure, and may transmit data with respect to the logical channel, in consideration of a priority and the prioritisedBitRate. In this regard, the higher the priority is, or the greater the value of the prioritisedBitRate is, more data may be transmitted.

13) In a case where the DAPS handover method is applied in the above descriptions, when the UE has to transmit UL data via the first bearer for the source BS because the first condition provided in the disclosure is not satisfied yet, the UE may select the MAC layer of the first bearer as a target for the LCP procedure with respect to only a bearer or logical channel identifiers for which the DAPS handover method (or a handover method by which data can be continuously transmitted to the source BS even after a handover command message is received) is indicated, and may perform the LCP procedure. This is because, when the UE receives a handover command message with respect to bearers or a logical channel identifier to which the DAPS handover method is not applied, the UE cannot transmit UL data to the source BS, the UE may not select the bearers or the logical channel identifier as a target for the LCP procedure.

14) When second bucketSizeDuration with respect to a logical channel is newly configured in the MAC layer configuration information configured in the handover command message, the UE may perform the DAPS handover method provided in the disclosure. In this regard, the UE may apply the second PDCP layer architecture and maintain existing configuration information with respect to the MAC layer of the first bearer for the source BS which corresponds to a bearer identifier indicated above, may configure a new logical channel identifier with respect to the MAC layer of the second bearer for the target BS, the new logical channel identifier being indicated in the configuration information, and may configure newly configured second bucketSizeDuration corresponding to the new logical channel identifier indicated in the configuration information. As another method, the UE may start applying the second bucketSizeDuration to the new logical channel identifier in the MAC layer of the second bearer for the target BS after the first condition provided in the disclosure is satisfied (by doing so, when different handover methods are indicated for respective bearers, UL transmit resources may be fairly distributed). In the descriptions above, a bucket size indicates a maximum value a value of prioritisedBitRate can have when the prioritisedBitRate is accumulated.

15) When second available SCell information, available subcarrier spacing information, maximum PUSCH duration, or logical channel group configuration information is configured in the MAC layer configuration information configured in the handover command message, the UE may perform the DAPS handover method provided in the disclosure. In this regard, the UE may apply the second PDCP layer architecture and maintain existing configuration information with respect to the MAC layer of the first bearer for the source BS which corresponds to a bearer identifier indicated above, and may configure the second available SCell information, the available subcarrier spacing information, the maximum PUSCH duration, or the logical channel group configuration information with respect to the MAC layer of the second bearer for the target BS.

As described above, when the UE receives the handover command message, and the second handover message (e.g., embodiment 2 of the disclosure or the DAPS handover method) is indicated in the ReconfigWithSync information, or when the DAPS handover method is indicated for each bearer identifier or each logical channel identifier, the UE may continuously perform data transmission or reception to or from the source BS with respect to only bearers (AM bearer or UM bearer) for which the DAPS handover method is indicated after the UE receives the handover command message and then until the first condition provided in the disclosure is satisfied. When the first condition is satisfied, the UE may switch a BS for receiving UL data from the source BS to the target BS, but may receive DL data from the source BS until connection to the source BS is released. However, for bearers for which the DAPS handover method is not indicated, the UE cannot perform data transmission or reception to or from the source BS in a continuous manner or after the UE receives the handover command message and then until the first condition provided in the disclosure is satisfied. Therefore, in order to allow the UE to perform operations provided in the disclosure, one or more methods to be described below may be applied.

Method 1: As provided in the disclosure, when the UE receives the handover command message, and the second handover message (e.g., embodiment 2 of the disclosure or the DAPS handover method) is indicated in the ReconfigWithSync information, or when the DAPS handover method is indicated for each bearer identifier or each logical channel identifier, for example, when the MAC layer of the UE for the source BS performs the LCP procedure to transmit data from when the UE receives the handover command message, the MAC layer of the UE for the source BS may select, as a candidate group, only logical channel identifiers corresponding to a bearer for which the DAPS handover method is indicated, and may perform the LCP procedure.

Also, the MAC layer of the UE for the source BS may maintain only logical channel identifiers for which the DAPS handover method is indicated or a prioritisedBitRate or bucket size duration corresponding to the logical channel identifiers. Also, the MAC layer of the UE for the source BS may release, may not use, or may not apply logical channel identifiers or a prioritisedBitRate or bucket size duration corresponding to the logical channel identifiers, the logical channel identifiers corresponding to a bearer for which the DAPS handover method is not indicated.

Also, the UE may perform a PDCP re-establishment procedure or an RLC re-establishment procedure on the bearer for which the DAPS handover method is not indicated, and may apply bearer configuration information such as a logical channel identifier, a prioritisedBitRate or bucket size duration, which is configured for the target BS, to the MAC layer for the target BS with respect to the bearer for which the DAPS handover method is not indicated in the handover message. Also, the UE may switch connection to a PDCP layer or an RLC layer, which corresponds to the bearer for which the DAPS handover method is not indicated, from the MAC layer for the source BS to the MAC layer for the target BS. That is, the UE may release, from the MAC layer for the source B S, configuration information of a PDCP layer, an RLC layer, or a MAC layer of the bearer for which the DAPS handover method is not indicated, and may perform application or connection to the MAC layer for the target BS, according to bearer configuration for the target BS.

Also, the UE may perform data transmission or reception to or from the source BS until the first condition provided in the disclosure is satisfied, may initialize a prioritisedBitRate with respect to a logical channel identifier in the MAC layer for the source BS, the logical channel identifier corresponding to the bearer for which the DAPS handover method is not indicated, and may release or stop the bearer without applying a prioritisedBitRate accumulation calculation procedure. Also, the MAC layer of the UE for the source BS may continuously maintain a prioritisedBitRate with respect to a logical channel identifier corresponding to the bearer for which the DAPS handover method is indicated, and may perform an accumulation calculation procedure.

When the first condition is satisfied, the UE may perform switching on data transmission to the target BS, and the MAC layer for the target BS may initialize a prioritisedBitRate with respect to newly-configured logical channel identifiers or may start accumulation calculation (as another method, when the UE receives a handover command message with respect to the MAC layer for the target BS, the UE may initialize a prioritisedBitRate and may start accumulation calculation. Also, when the bearers for which the DAPS handover method is not indicated are discontinued, the UE may resume the bearers, may start data transmission or reception to or from the target BS, and may initialize a prioritisedBitRate or start accumulation calculation. When the first condition is satisfied, the UE may initialize a prioritisedBitRate with respect to logical channel identifiers configured in the MAC layer for the source BS and may stop accumulation calculation.

Also, the UE may perform data reception from the source BS or the target BS until the second condition provided in the disclosure is satisfied, may initialize the MAC layer for the source BS when the second condition is satisfied, and may release, from the MAC layer for the source BS, the RLC layer, the PDCP layer or the bearer configuration information which is connected to the MAC layer for the source BS and which corresponds to the bearer for which the DAPS handover method is not indicated. Also, the UE may release, from the second PDCP layer architecture or the MAC layer for the source BS, the RLC layer or bearer configuration information which corresponds to the bearer for which the DAPS handover method is indicated.

Method 2: As provided in the disclosure, when the UE receives the handover command message, and the second handover message (e.g., embodiment 2 of the disclosure or the DAPS handover method) is indicated in the ReconfigWithSync information, or when the DAPS handover method is indicated for each bearer identifier or each logical channel identifier, an upper layer (e.g., an RRC layer) of the UE may indicate to perform MAC reconfiguration on the MAC layer for the source BS, based on the configuration information excluding, from configuration information of a current MAC layer, configuration information related to the bearer for which the DAPS handover method is not indicated in the handover command message.

As another method, the upper layer (e.g., the RRC layer) of the UE may indicate to perform MAC reconfiguration on the MAC layer for the source BS, based on the configuration information including, from configuration information of the current MAC layer, only configuration information related to the bearer for which the DAPS handover method is indicated in the handover command message. When the UE reconfigures the MAC layer for the source BS, the MAC layer of the UE for the source BS may maintain only logical channel identifiers corresponding to a bearer for which the DAPS handover method is indicated or a prioritisedBitRate or bucket size duration corresponding to the logical channel identifiers, and may release, may not use, or may not apply logical channel identifiers or a prioritisedBitRate or bucket size duration corresponding to the logical channel identifiers, the logical channel identifiers corresponding to a bearer for which the DAPS handover method is not indicated.

The upper layer (e.g., the RRC layer) of the UE may indicate the MAC layer for the target BS to perform a PDCP re-establishment procedure or an RLC re-establishment procedure on the bearer for which the DAPS handover method is not indicated, and to apply bearer configuration information such as a logical channel identifier, a prioritisedBitRate or bucket size duration, which is configured for the target BS, to the MAC layer for the target BS with respect to the bearer for which the DAPS handover method is not indicated in the handover message. Also, the upper layer (e.g., the RRC layer) of the UE may switch connection to a PDCP layer or an RLC layer, which corresponds to the bearer for which the DAPS handover method is not indicated, from the MAC layer for the source BS to the MAC layer for the target BS. For example, when the MAC layer of the UE for the source BS performs the LCP procedure to transmit data from when connection is switched, the MAC layer of the UE for the source BS may select, as a candidate group, only logical channel identifiers corresponding to a bearer for which the DAPS handover method is indicated, and may perform the LCP procedure. A procedure of reconfiguring the MAC layer for the source BS, the procedure performed by the upper layer (e.g., the RRC layer), may include a procedure in which the MAC layer for the source BS is partially MAC reset and thus performs a same procedure. For example, the upper layer (e.g., the RRC layer) may initialize, release, or stop using configuration information of the MAC layer for the bearer for which the DAPS handover method is not indicated.

Also, the UE may perform data transmission or reception to or from the source BS until the first condition provided in the disclosure is satisfied, may initialize a prioritisedBitRate with respect to a logical channel identifier in the MAC layer for the source BS, the logical channel identifier corresponding to the bearer for which the DAPS handover method is not indicated, and may release or stop the bearer without applying a prioritisedBitRate accumulation calculation procedure. Also, the MAC layer of the UE for the source BS may continuously maintain a prioritisedBitRate with respect to a logical channel identifier corresponding to the bearer for which the DAPS handover method is indicated, and may perform an accumulation calculation procedure. When the first condition is satisfied, the UE may perform switching on data transmission to the target BS, and the MAC layer for the target BS may initialize a prioritisedBitRate with respect to newly-configured logical channel identifiers or may start accumulation calculation (as another method, when the UE receives a handover command message with respect to the MAC layer for the target BS, the UE may initialize a prioritisedBitRate and may start accumulation calculation. Also, when the bearers for which the DAPS handover method is not indicated are discontinued, the UE may resume the bearers, may start data transmission or reception to or from the target BS, and may initialize a prioritisedBitRate or start accumulation calculation. When the first condition is satisfied, the UE may initialize a prioritisedBitRate with respect to logical channel identifiers configured in the MAC layer for the source BS and may stop accumulation calculation.

Also, the UE may perform data reception from the source BS or the target BS until the second condition provided in the disclosure is satisfied, may initialize the MAC layer for the source BS when the second condition is satisfied, and may release, from the MAC layer for the source BS, the RLC layer, the PDCP layer or the bearer configuration information which is connected to the MAC layer for the source BS and which corresponds to the bearer for which the DAPS handover method is not indicated. Also, the UE may release, from the second PDCP layer architecture or the MAC layer for the source BS, the RLC layer or bearer configuration information which corresponds to the bearer for which the DAPS handover method is indicated.

Method 3: As provided in the disclosure, when the UE receives the handover command message, the second handover message (e.g., embodiment 2 of the disclosure or the DAPS handover method) may be indicated in the ReconfigWithSync information, or the DAPS handover method may be indicated for each bearer identifier or each logical channel identifier In this regard, for example, when the MAC layer of the UE for the source BS performs the LCP procedure to transmit data from when the UE receives the handover command message, the UE may indicate, to the MAC layer for the source BS, that a PDCP layer corresponding to the bearer for which the DAPS handover method is not indicated does not have data to be transmitted in a buffer or a PDCP data volume is 0, such that the LCP procedure may be performed only on logical channel identifiers corresponding to the bearer for which the DAPS handover method is indicated. Therefore, the MAC layer for the source BS may determine that there is no data to be transmitted with respect to the DAPS handover method is not indicated, and may not perform the LCP procedure on logical channel identifiers corresponding to the bearer for which the DAPS handover method is not indicated.

Also, the UE may perform a PDCP re-establishment procedure or an RLC re-establishment procedure on the bearer for which the DAPS handover method is not indicated, and may apply bearer configuration information such as a logical channel identifier, a prioritisedBitRate or bucket size duration, which is configured for the target BS, to the MAC layer for the target BS with respect to the bearer for which the DAPS handover method is not indicated in the handover message. Also, the UE may switch connection to a PDCP layer or an RLC layer, which corresponds to the bearer for which the DAPS handover method is not indicated, from the MAC layer for the source BS to the MAC layer for the target BS. That is, the UE may release, from the MAC layer for the source B S, configuration information of a PDCP layer, an RLC layer, or a MAC layer of the bearer for which the DAPS handover method is not indicated, and may perform application or connection to the MAC layer for the target BS, according to bearer configuration for the target BS.

Also, the UE may perform data transmission or reception to or from the source BS until the first condition provided in the disclosure is satisfied, may initialize a prioritisedBitRate with respect to a logical channel identifier in the MAC layer for the source BS, the logical channel identifier corresponding to the bearer for which the DAPS handover method is not indicated, and may release or stop the bearer without applying a prioritisedBitRate accumulation calculation procedure. Also, the MAC layer of the UE for the source BS may continuously maintain a prioritisedBitRate with respect to a logical channel identifier corresponding to the bearer for which the DAPS handover method is indicated, and may perform an accumulation calculation procedure.

When the first condition is satisfied, the UE may perform switching on data transmission to the target BS, and the MAC layer for the target BS may initialize a prioritisedBitRate with respect to newly-configured logical channel identifiers or may start accumulation calculation (as another method, when the UE receives a handover command message with respect to the MAC layer for the target BS, the UE may initialize a prioritisedBitRate and may start accumulation calculation. Also, when the bearers for which the DAPS handover method is not indicated are discontinued, the UE may resume the bearers, may start data transmission or reception to or from the target BS, and may initialize a prioritisedBitRate or start accumulation calculation. When the first condition is satisfied, the UE may initialize a prioritisedBitRate with respect to logical channel identifiers configured in the MAC layer for the source BS and may stop accumulation calculation.

Also, the UE may perform data reception from the source BS or the target BS until the second condition provided in the disclosure is satisfied, may initialize the MAC layer for the source BS when the second condition is satisfied, and may release, from the MAC layer for the source BS, the RLC layer, the PDCP layer or the bearer configuration information which is connected to the MAC layer for the source BS and which corresponds to the bearer for which the DAPS handover method is not indicated. Also, the UE may release, from the second PDCP layer architecture or the MAC layer for the source BS, the RLC layer or bearer configuration information which corresponds to the bearer for which the DAPS handover method is indicated.

Figure 1K:
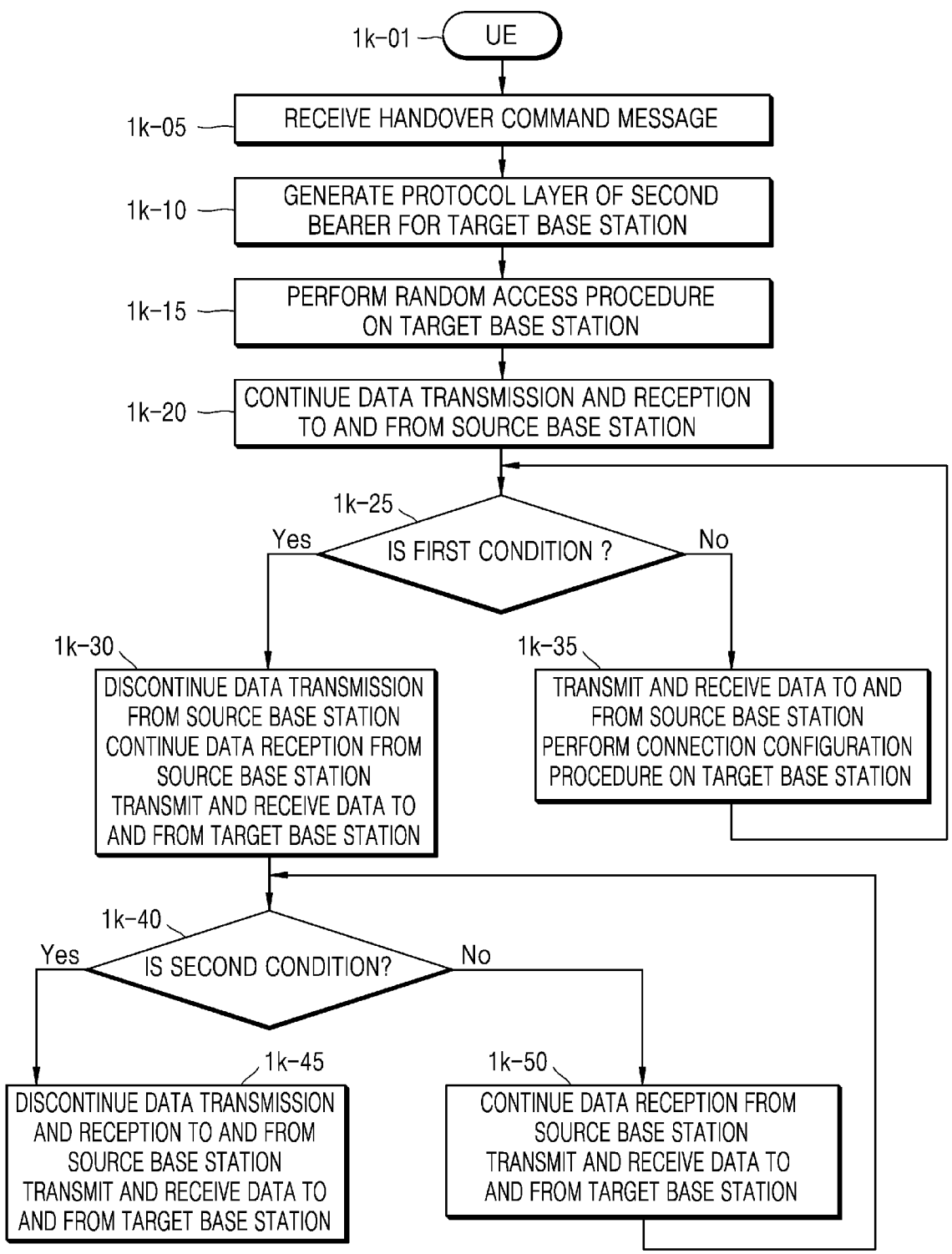
FIG. 1K is a diagram illustrating operations of a UE, according to embodiments of the disclosure.

FIG. 1K is a diagram illustrating operations of a UE 1k-01, according to embodiments of the disclosure.

In FIG. 1K, the UE 1k-01 may perform data transmission or reception to or from a source BS with respect to each bearer via a first PDCP layer architecture. When a handover command message received by the UE 1k-01 (operation 1k-05) indicates the DAPS handover method of embodiment 2 provided in the disclosure or indicates the DAPS handover method for each bearer, the UE 1k-01 may switch the first PDCP layer architecture to a second PDCP layer architecture for each bearer or bearers for which the DAPS handover method is indicated, with respect to a target BS indicated in the handover command message. Also, the UE 1k-01 may configure and establish protocol layers of a second bearer and may perform a random access procedure on the target BS via the established protocol layers. When the UE 1k-01 performs the random access procedure on the target BS (operations 1k-10 and 1k-15), the UE 1k-01 may continuously perform data transmission or reception (UL data transmission and DL data reception) to or from the source BS via protocol layers of a first bearer (operation 1k-20).

When the first condition of the disclosure is satisfied (operation 1k-25), the UE 1k-01 may discontinue UL data transmission to the source BS via the protocol layers of the first bearer, and may switch the UL data transmission and thus may transmit UL data to the target BS via the protocol layers of the second bearer. In this regard, the UE 1k-01 may continuously receive DL data from the source BS and the target BS via the protocol layers of the first and second bearers (operation 1k-30). Also, a PDCP layer of the second bearer may continuously perform data transmission or reception to or from the target BS without interruption by using transmitted and/or received data stored in a PDCP layer of the first bearer, SN information, or information such as header compression and decompression context.

When the first condition is not satisfied, the UE 1k-01 may continuously check the first condition while continuously performing an ongoing procedure.

When the second condition is satisfied, the UE 1k-01 may discontinue DL data reception from the source BS via the protocol layers of the first bearer (operation 1k-45). Also, the PDCP layer of the second bearer of the UE 1k-01 may continuously perform data transmission or reception to or from the target BS without interruption by using transmitted and/or received data stored in the PDCP layer of the first bearer, SN information, or information such as header compression and decompression context.

When the second condition is not satisfied, the UE 1k-01 may continuously check the second condition while continuously performing an ongoing procedure (operation 1k-50).

According to an embodiment of the disclosure, a PDCP layer provided in the disclosure may perform different procedures according to types of handover indicated in a handover command message received by a UE.

When handover indicated in the handover command message the UE receives from a source BS is handover (e.g., a normal handover method) of embodiment 1, the UE may perform a PDCP re-establishment procedure on the PDCP layer according to each bearer.

When handover indicated in the handover command message the UE receives from the source BS is handover of embodiment 2 (or is indicated for each bearer), the UE may perform procedures on each bearer (or a bearer for which embodiment 2 is indicated), the procedures being provided in the disclosure on condition that the first condition is satisfied.

When the source BS indicates, to the UE, handover to which embodiments provided in the disclosure are applied, the source BS may start data forwarding to a target BS when a third condition below is satisfied. The third condition according to an embodiment of the disclosure may mean that one or more conditions below is satisfied.

In a case where the UE receives, from the target BS, an indication indicating that handover is successfully completed.

In a case where the source BS transmits a handover command message to the UE.

In a case where the source BS transmits a handover command message to the UE and identifies successful delivery (HARQ ACK or NACK or RLC ACK or NACK) of the handover command message.

In a case where the source BS receives, from the UE, an indication (e.g., an RRC message (e.g., an RRCReconfiguration message)) indicating that connection to the source BS is to be release, or receives a MAC CE, an RLC control PDU, or PDCP control PDU from the UE.

In a case where the source BS transmits a handover command message to the UE and drives a certain timer, and then the timer is expired.

In a case where acknowledgement (HARQ ACK or NACK or RLC ACK or NACK) with respect to successful delivery of DL data is not received from the UE for a certain time.

Figure 1L:
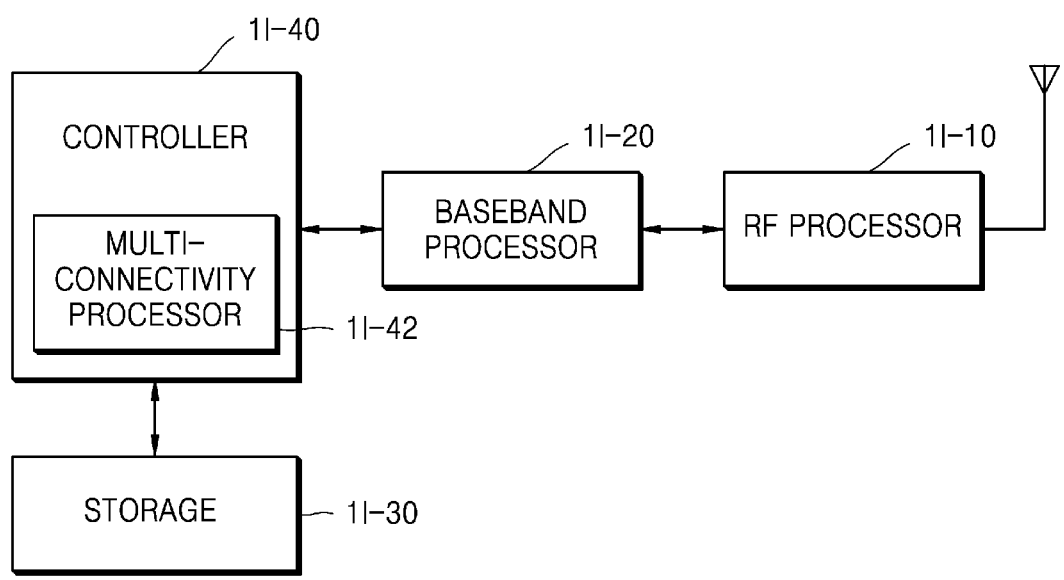
FIG. 1L is a diagram illustrating a configuration of a UE to which an embodiment of the disclosure is applicable.

FIG. 1L is a diagram illustrating a configuration of a UE to which an embodiment of the disclosure is applicable.

Referring to FIG. 1L, the UE may include a radio frequency (RF) processor 1*l*-10, a baseband processor 1*l*-20, a storage 1*l*-30, and a controller 1*l*-40 including a multi-connectivity processor 1*l*-42. However, the configuration of the UE is not limited to that shown in FIG. 1L.

The RF processor 1*l*-10 performs functions for transmitting and receiving signals through wireless channels, e.g., band conversion and amplification of the signals. That is, the RF processor 1*l*-10 up-converts a baseband signal provided from the baseband processor 1*l*-20, into an RF band signal and then transmits the RF band signal through an antenna, and down-converts an RF band signal received through the antenna, into a baseband signal. For example, the RF processor 1*l*-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1L, the UE may include a plurality of antennas. The RF processor 1*l*-10 may include a plurality of RF chains. Also, the RF processor 1*l*-10 may perform beamforming. For beamforming, the RF processor 1*l*-10 may adjust phases and intensities of respective signals that are transmitted or received through a plurality of antennas or antenna elements. The RF processor 1*l*-10 may perform a MIMO operation and may receive a plurality of layers in the MIMO operation. The RF processor 1*l*-10 may perform receive beam sweeping by appropriately configuring a plurality of antennas or antenna elements, or may adjust a direction and a beam width of a received beam to coordinate with a transmit beam, by the control of the controller 1*l*-40.

The baseband processor 1*l*-20 performs conversion between a baseband signal and a bitstream based on physical layer specifications of a system. For example, for data transmission, the baseband processor 1*l*-20 generates complex symbols by encoding and modulating a transmit bitstream. For data reception, the baseband processor 1*l*-20 reconstructs a received bitstream by demodulating and decoding a baseband signal provided from the RF processor 1*l*-10. For example, according to an OFDM scheme, for data transmission, the baseband processor 1*l*-20 generates complex symbols by encoding and modulating a transmit bitstream, maps the complex symbols to subcarriers, and then configures OFDM symbols by performing inverse fast Fourier transformation (IFFT) and inserting a cyclic prefix (CP). For data reception, the baseband processor 1*l*-20 segments a baseband signal provided from the RF processor 1-10, into OFDM symbol units, reconstructs signals mapped to subcarriers by performing fast Fourier transformation (FFT) calculation, and then reconstructs a received bitstream by demodulating and decoding the signals.

The baseband processor 1*l*-20 and the RF processor 1*l*-10 transmit and receive signals in a manner described above. Accordingly, the baseband processor 1*l*-20 and the RF processor 1*l*-10 may also be called a transmitter, a receiver, a transceiver, or a communicator. At least one of the baseband processor 1*l*-20 or the RF processor 1*l*-10 may include a plurality of communication modules to support a plurality of different radio access technologies. At least one of the baseband processor 1*l*-20 or the RF processor 1*l*-10 may include different communication modules to process signals of different frequency bands. For example, the different radio access technologies may include an LTE network, a NR network, or the like. The different frequency bands may include a super-high frequency (SHF) (e.g., 2.5 GHz or 5 GHz) band and a millimeter wave (mmWave) (e.g., 60 GHz) band.

The storage 1*l*-30 may store basic programs, application programs, and data, e.g., configuration information, for operations of the UE. The storage 1*l*-30 may provide the stored data upon request by the controller 1*l*-40.

The controller 1*l*-40 controls overall operations of the UE. The controller 1*l*-40 controls operations of the UE according to embodiments of the disclosure. For example, the controller 1*l*-40 transmits and receives signals through the baseband processor 1*l*-20 and the RF processor 1*l*-10. The controller 1*l*-40 records or reads data on or from the storage 1*l*-30. To this end, the controller 1*l*-40 may include at least one processor. For example, the controller 1*l*-40 may include a communication processor (CP) for controlling communications and an application processor (AP) for controlling an upper layer such as an application program.

Figure 1M:
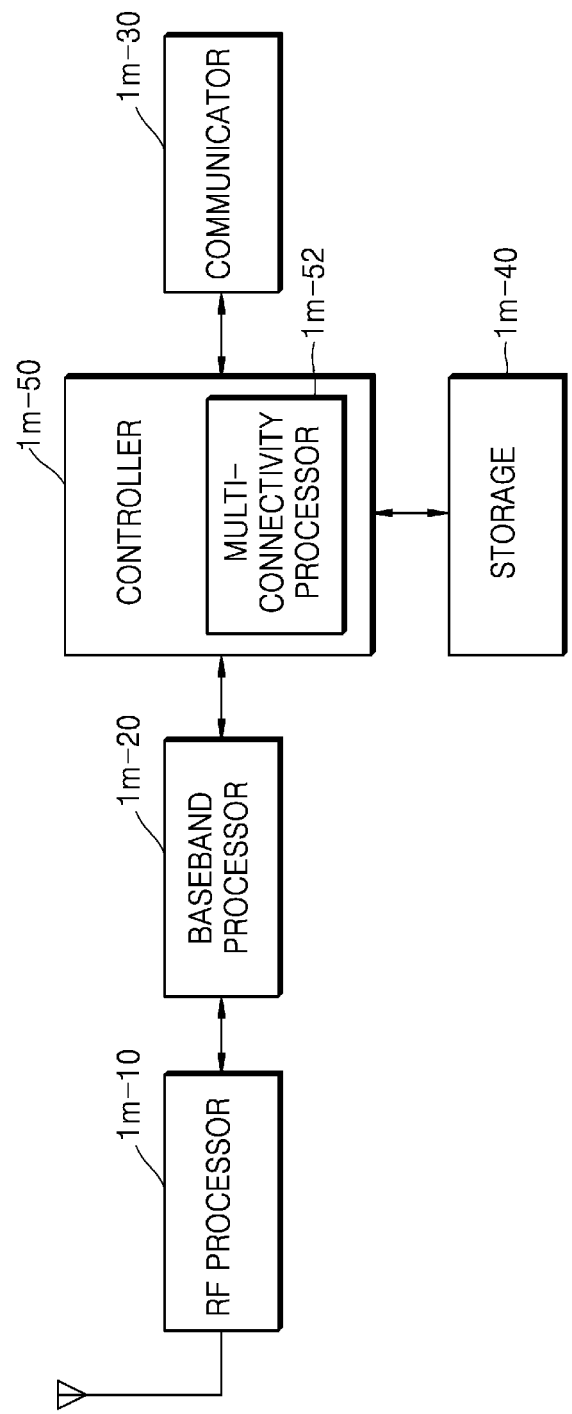
FIG. 1M is a diagram illustrating a configuration of a base station (BS) to which an embodiment of the disclosure is applicable.

FIG. 1M is a diagram illustrating a configuration of a BS to which an embodiment of the disclosure is applicable.

Referring to FIG. 1M, the BS may include an RF processor 1*m*-10, a baseband processor 1*m*-20, a communicator 1*m*-30, a storage 1*m*-40, and a controller 1*m*-50 including a multi-connectivity processor 1*m*-52. However, the configuration of the BS is not limited to that shown in FIG. 1M.

The RF processor 1*m*-10 performs functions for transmitting and receiving signals through wireless channels, e.g., band conversion and amplification of the signals. That is, the RF processor 1m-10 up-converts a baseband signal provided from the baseband processor 1m-20, into an RF band signal and then transmits the RF band signal through an antenna, and down-converts an RF band signal received through the antenna, into a baseband signal. For example, the RF processor 1m-10 may include a transmit filter, a receive filter, an amplifier, a mixer, an oscillator, a DAC, an ADC, or the like. Although only one antenna is illustrated in FIG. 1M, the BS may include a plurality of antennas. The RF processor 1m-10 may include a plurality of RF chains. Also, the RF processor 1m-10 may perform beamforming. For beamforming, the RF processor 1m-10 may adjust phases and intensities of respective signals that are transmitted or received through a plurality of antennas or antenna elements. The RF processor 1m-10 may perform a DL MIMO operation by transmitting one or more layers.

The baseband processor 1m-20 performs conversion between a baseband signal and a bitstream based on physical layer specifications of a first radio access technology. For example, for data transmission, the baseband processor 1m-20 may generate complex symbols by encoding and modulating a transmit bitstream. For data reception, the baseband processor 1m-20 reconstructs a received bitstream by demodulating and decoding a baseband signal provided from the RF processor 1m-10. For example, according to an OFDM scheme, for data transmission, the baseband processor 1m-20 generates complex symbols by encoding and modulating a transmit bitstream, maps the complex symbols to subcarriers, and then configures OFDM symbols by performing IFFT and inserting a CP. For data reception, the baseband processor 1m-20 segments a baseband signal provided from the RF processor 1m-10, into OFDM symbol units, reconstructs signals mapped to subcarriers by performing FFT calculation, and then reconstructs a received bitstream by demodulating and decoding the signals. The baseband processor 1m-20 and the RF processor 1m-10 transmit and receive signals as described above. As such, the baseband processor 1m-20 and the RF processor 1m-10 may also be called a transmitter, a receiver, a transceiver, a communicator, or a wireless communicator.

The communicator 1m-30 provides an interface for communicating with other nodes in a network.

The storage 1m-30 may store basic programs, application programs, and data, e.g., configuration information, for operations of the BS. In particular, the storage 1m-40 may store, for example, information about bearers assigned for a connected UE and measurement results reported from the connected UE. The storage 1m-40 may store criteria information used to determine whether to provide or release multiconnection to or from the UE. The storage 1m-40 provides the stored data upon request by the controller 1m-50.

The controller 1m-50 controls overall operations of the BS. The controller 1m-50 controls operations of the BS according to embodiments of the disclosure. For example, the controller 1m-50 transmits and receives signals through the baseband processor 1m-20 and the RF processor 1m-10 or the communicator 1m-30 including a backhaul communicator. The controller 1m-50 records or reads data on or from the storage 1m-40. To this end, the controller 1m-50 may include at least one processor.

The methods according to the embodiments of the disclosure as described herein or in the following claims may be implemented as hardware, software, or a combination of hardware and software.

When implemented as software, a computer-readable storage medium or a computer program product, which stores one or more programs (e.g., software modules), may be provided. The one or more programs that are stored in the computer-readable storage medium or the computer program product are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read-only memory (ROM), electrically erasable programmable read only memory (EEPROM), a magnetic disc storage device, a compact disc-ROM (CD-ROM), digital versatile discs (DVDs), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access, via an external port, the electronic device for performing embodiments of the disclosure. Furthermore, an additional storage device on the communication network may access the electronic device for performing embodiments of the disclosure.

In the disclosure, provided are various efficient handover methods for preventing occurrence of a data interruption time due to handover when the handover is performed in a next-generation mobile communication system, such that a service without data interruption may be supported.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, portions of an embodiment of the disclosure are combined with portions of another embodiment of the disclosure. The embodiments of the disclosure may also be applied to other communication systems such as an LTE system, a 5G or NR system, or the like, and various modifications based on the technical concept of the embodiments of the disclosure may be made.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a source base station for performing a dual active protocol stack (DAPS) handover in a wireless communication system, the method comprising:
   transmitting, to a target base station, a handover request including a first indicator indicating the DAPS handover is requested for a bearer;
   receiving, from the target base station, a handover request acknowledgment message, the handover request acknowledgment message including a radio resource control (RRC) reconfiguration message for a user equipment (UE) and a second indicator indicating the DAPS handover is accepted or not for the bearer; and
   transmitting, to the UE, the RRC reconfiguration message received in the handover request acknowledgment message,
   wherein the RRC reconfiguration message includes DAPS configuration information for the bearer in case that the second indicator indicates that the DAPS handover is accepted by the target base station,
   wherein the first indicator and the second indicator are identified per data radio bearer (DRB), and
   wherein the DAPS handover indicates a handover procedure that maintains connection between the source base station and the UE after the UE receives the RRC reconfiguration message and until the UE releases the source base station after successful random access of the UE to the target base station.

2. The method of claim 1, wherein the DAPS configuration information for the bearer is not included in the RRC reconfiguration message in case that the second indicator indicates that the DAPS handover is not accepted by the target base station.

3. A source base station for performing a dual active protocol stack (DAPS) handover in a wireless communication system, the source base station comprising:
   a transceiver; and
   at least one processor connected with the transceiver and configured to:
      transmit, to a target base station, a handover request including a first indicator indicating the DAPS handover is requested for a bearer;
      receive, from the target base station, a handover request acknowledgment message, the handover request acknowledgment message including a radio resource control (RRC) reconfiguration message for a user equipment (UE) and a second indicator indicating the DAPS handover is accepted or not for the bearer; and
      transmit, to the UE, the RRC reconfiguration message received in the handover request acknowledgment message,
   wherein the RRC reconfiguration message includes DAPS configuration information for the bearer in case that the second indicator indicates that the DAPS handover is accepted by the target base station,
   wherein the first indicator and the second indicator are identified per data radio bearer (DRB), and
   wherein the DAPS handover indicates a handover procedure that maintains connection between the source base station and the UE after the UE receives the RRC reconfiguration message and until the UE releases the source base station after successful random access of the UE to the target base station.

4. The source base station of claim 3, wherein the DAPS configuration information for the bearer is not included in the RRC reconfiguration message in case that the second indicator indicates that the DAPS handover is not accepted by the target base station.

5. A method of a target base station for performing a dual active protocol stack (DAPS) handover in a wireless communication system, the method comprising:
   receiving, from a source base station, a handover request including a first indicator indicating the DAPS handover is requested for a bearer; and
   transmitting, to the source base station, a handover request acknowledgment message, the handover request acknowledgment message including a radio resource control (RRC) reconfiguration message for a user equipment (UE) and a second indicator indicating the DAPS handover is accepted or not for the bearer,
   wherein the RRC reconfiguration message includes DAPS configuration information for the bearer in case that the second indicator indicates that the DAPS handover is accepted by the target base station,
   wherein the first indicator and the second indicator are identified per data radio bearer (DRB), and
   wherein the DAPS handover indicates a handover procedure that maintains connection between the source base station and the UE after the UE receives the RRC reconfiguration message and until the UE releases the source base station after successful random access of the UE to the target base station.

6. The method of claim 5, wherein the DAPS configuration information for the bearer is not included in the RRC reconfiguration message in case that the second indicator indicates that the DAPS handover is not accepted by the target base station.

7. A target base station for performing a dual active protocol stack (DAPS) handover in a wireless communication system, the target base station comprising:
   a transceiver; and
   at least one processor connected with the transceiver and configured to:
      receive, from a source base station, a handover request including a first indicator indicating the DAPS handover is requested for a bearer; and
      transmit, to the source base station, a handover request acknowledgment message, the handover request acknowledgment message including a radio resource control (RRC) reconfiguration message for a user equipment (UE) and a second indicator indicating the DAPS handover is accepted or not for the bearer,
   wherein the RRC reconfiguration message includes DAPS configuration information for the bearer in case that the second indicator indicates that the DAPS handover is accepted by the target base station,
   wherein the first indicator and the second indicator are identified per data radio bearer (DRB), and
   wherein the DAPS handover indicates a handover procedure that maintains connection between the source base station and the UE after the UE receives the RRC reconfiguration message and until the UE releases the source base station after successful random access of the UE to the target base station.

8. The target base station of claim 7, wherein the DAPS configuration information for the bearer is not included in the RRC reconfiguration message in case that the second indicator indicates that the DAPS handover is not accepted by the target base station.

* * * * *